(12) United States Patent
Baek et al.

(10) Patent No.: US 11,503,502 B2
(45) Date of Patent: Nov. 15, 2022

(54) METHOD AND DEVICE FOR CONTROLLING DUPLICATE PACKET TRANSMISSION IN WIRELESS COMMUNICATION SYSTEM

(71) Applicant: Samsung Electronics Co., Ltd., Suwon-si (KR)

(72) Inventors: Sangkyu Baek, Suwon-si (KR); Soenghun Kim, Suwon-si (KR); Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 17/264,269

(22) PCT Filed: Aug. 1, 2019

(86) PCT No.: PCT/KR2019/009609
§ 371 (c)(1),
(2) Date: Jan. 28, 2021

(87) PCT Pub. No.: WO2020/027599
PCT Pub. Date: Feb. 6, 2020

(65) Prior Publication Data
US 2021/0297899 A1    Sep. 23, 2021

(30) Foreign Application Priority Data
Aug. 1, 2018 (KR) .................. 10-2018-0090061

(51) Int. Cl.
*H04W 4/00* (2018.01)
*H04W 28/06* (2009.01)
*H04W 48/16* (2009.01)
*H04W 80/02* (2009.01)
*H04W 84/18* (2009.01)

(52) U.S. Cl.
CPC ........... *H04W 28/06* (2013.01); *H04W 48/16* (2013.01); *H04W 80/02* (2013.01); *H04W 84/18* (2013.01)

(58) Field of Classification Search
CPC ..... H04W 28/04; H04W 28/06; H04W 48/16; H04W 80/02; H04W 72/04; H04W 72/042; H04W 88/08; H04L 5/0007
(Continued)

(56) References Cited

U.S. PATENT DOCUMENTS

2018/0098250 A1  4/2018  Vrzic et al.
2021/0152296 A1  5/2021  Chen

FOREIGN PATENT DOCUMENTS

CN    107342851 A    11/2017

OTHER PUBLICATIONS

Huawei, HiSilicon, "Discussion on the MAC impact from packet duplication", 3GPP TSG-RAN2 Meeting #101, Feb. 26-Mar. 2, 2018, R2-1802675, 5 pages.
(Continued)

*Primary Examiner* — Temica M Beamer

(57) ABSTRACT

The disclosure relates to a method and apparatus for controlling packet duplication transmission in a wireless communication system. According to an embodiment of the disclosure, a method, performed by a user equipment (UE), of controlling packet duplication transmission in a wireless communication system includes: receiving a packet duplication configuration for a radio bearer, through a radio resource control (RRC) message, from a base station; determining whether each of a plurality of radio link control (RLC) entities is configured to be used for uplink packet duplication transmission; and performing, when packet duplication transmission is activated, packet duplication
(Continued)

transmission by using a RLC entity set to be used for uplink packet duplication transmission.

20 Claims, 19 Drawing Sheets

(58) Field of Classification Search
USPC .......................................................... 370/329
See application file for complete search history.

(56) References Cited

OTHER PUBLICATIONS

Huawei, HiSilicon, "Introducing UL duplication to PDCP", 3GPP TSG-RAN WG2 Meeting AH 1801, Jan. 22-Jan. 26, 2018, R2-1800228, 5 pages.
OPPO, "Remaining issues of duplication control using MAC CE", 3GPP TSG-RAN2 #101, Feb. 26-Mar. 2, 2018, R2-1801764, 6 pages.
Vivo, "Remaining issues of PDCP duplication", 3GPP TSG-RAN WG2 Meeting #101, Feb. 26-Mar. 2, 2018, R2-1801988, 9 pages.
International Search Report dated Nov. 14, 2019 in connection with International Patent Application No. PCT/KR2019/009609, 2 pages.
Written Opinion of the International Searching Authority dated Nov. 14, 2019 in connection with International Patent Application No. PCT/KR2019/009609, 4 pages.
Supplementary European Search Report dated Jul. 27, 2021, in connection with European Application No. 19845551.1, 17 pages.
Huawei, et al., "Discussion on PDCP duplication in L2 parameters," R2-1808423, 3GPP TSG-RAN WG2 Meeting 102, Busan, Korea, May 21-25, 2018, 8 pages.

METHOD AND DEVICE FOR CONTROLLING DUPLICATE PACKET TRANSMISSION IN WIRELESS COMMUNICATION SYSTEM

CROSS-REFERENCE TO RELATED APPLICATIONS

This application is a 371 of International Application No. PCT/KR2019/009609 filed on Aug. 1, 2019, which claims priority to Korean Patent Application No. 10-2018-0090061 filed on Aug. 1, 2018, the disclosures of which are herein incorporated by reference in their entirety.

BACKGROUND

1. Field

The disclosure relates to a method and apparatus for controlling packet duplication transmission in a wireless communication system.

2. Description of Related Art

To meet the increasing demand with respect to wireless data traffic after the commercialization of $4^{th}$ generation (4G) communication systems, efforts to develop an enhanced $5^{th}$ generation (5G) communication system or a pre-5G communication system are continuing. For this reason, a 5G communication system or pre-5G communication system is called a Beyond 4G Network communication system or a post long term evolution (LTE) system. The 5G communication system defined by the 3rd generation Partnership Project (3GPP) is called a new radio (NR) system. To achieve a high data transmission rate, the implementation of 5G communication systems in an ultra-high-frequency (mmWave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antenna are being discussed, and applied to the NR system. Also, to improve the network of the system, various technologies, such as advanced small cell, cloud radio access network (cloud RAN), ultra-dense networks, device to device communication (D2D), wireless backhaul, moving networks, cooperative communication, coordinated multi-points (CoMP), and interference cancellation, have been developed for 5G communication systems. In addition, other technologies, such as hybrid frequency-shift keying (FSK) and quadrature amplitude modulation (QAM) modulation (FQAM) and sliding window superposition coding (SWSC) based on advanced coding modulation (ACM), and filter bank multi carrier (FBMC), non-orthogonal multiple access (NOMA), and sparse code multiple access (SCMA) based on enhanced access technology have been developed for 5G communication systems.

Meanwhile, the Internet is evolving from a human-centered network in which humans generate and consume information to an Internet of Things (IoT) network in which distributed components such as objects transmit, receive, and process information. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, 5G communication, such as sensor networks, M2M communication, and MTC, is implemented by technologies, such as beam forming, MIMO, and array antenna. Applying a cloud radio access network (CRAN) as big data processing technology is also an example of the convergence of 5G technology and IoT technology.

As various services can be provided due to the aforementioned features and the development of mobile communication systems, a method for effectively providing such services is required.

SUMMARY

According to an embodiment of the disclosure, a method, performed by a user equipment (UE), of controlling packet duplication transmission in a wireless communication system includes: receiving a packet duplication configuration for a radio bearer through a radio resource control (RRC) message, from a base station; determining whether each of a plurality of radio link control (RLC) entities is configured to be used for uplink packet duplication transmission; and performing, when packet duplication transmission is activated, packet duplication transmission by using a RLC entity set to be used for the uplink packet duplication transmission.

According to an embodiment of the disclosure, a user equipment (UE) for controlling packet duplication transmission in a wireless communication system includes: a transceiver; a memory; and at least one processor configured to receive a packet duplication configuration for a radio bearer through a radio resource control (RRC) message, from a base station; determine whether each of a plurality of radio link control (RLC) entities is configured to be used for uplink packet duplication transmission; and perform, when packet duplication transmission is activated, packet duplication transmission by using a RLC entity set to be used for uplink packet duplication transmission.

According to a disclosed embodiment, an apparatus and method capable of effectively providing services in a mobile communication system may be provided.

DETAILED DESCRIPTION

Figure 1:
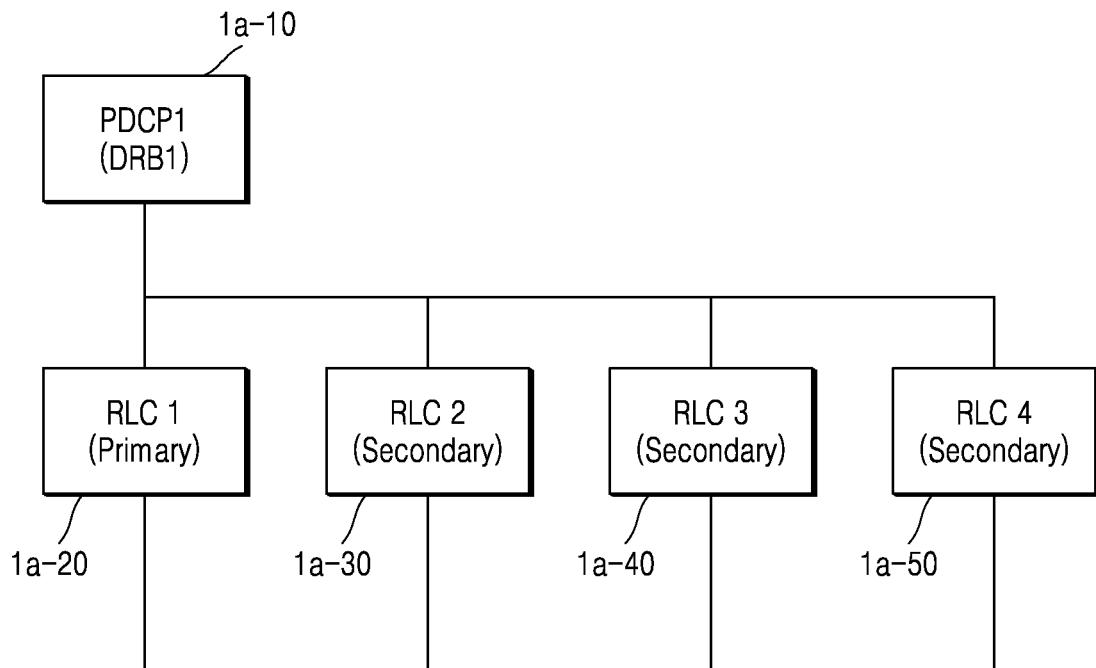
FIG. 1 illustrates a structure of a radio bearer to which packet duplication transmission is configured, according to an embodiment.

According to an embodiment of the disclosure, a method, performed by a user equipment (UE), of controlling packet duplication transmission in a wireless communication system, includes: receiving a packet duplication configuration for a radio bearer through a radio resource control (RRC) message, from a base station; determining whether each of a plurality of radio link control (RLC) entities is configured to be used for uplink packet duplication transmission; and performing, when packet duplication transmission is activated, packet duplication transmission by using a RLC entity set to be used for the uplink packet duplication transmission.

According to an embodiment of the disclosure, the determining of whether each of the plurality of RLC entities is configured to be used for uplink packet duplication transmission may include: receiving information indicating packet duplication activation or deactivation for the plurality of RLC entities through a medium access control control element (MAC CE) from the base station; and determining whether each of the plurality of RLC entities is configured to be used for uplink packet duplication transmission, based on the information indicating the packet duplication activation or deactivation.

According to an embodiment of the disclosure, the information indicating the packet duplication activation or deactivation may include radio bearer identification information including at least one of a radio bearer index or a radio bearer identifier (ID), and a plurality of fields respectively corresponding to the plurality of RLC entities.

According to an embodiment of the disclosure, the plurality of fields respectively corresponding to the plurality of RLC entities may be at least one of a plurality of fields respectively corresponding to all RLC entities set in the radio bearer, and a plurality of fields respectively corresponding to the RLC entities set to be used for uplink packet duplication transmission in the packet duplication configuration for the radio bearer.

According to an embodiment of the disclosure, the RRC message may include information about the RLC entity to be used for uplink packet duplication transmission among the plurality of RLC entities, and the determining of whether each of the plurality of RLC entities is configured to be used for uplink packet duplication transmission may include determining whether each of the plurality of RLC entities is configured to be used for uplink packet duplication transmission, based on the information about the RLC entity to be used for uplink packet duplication transmission.

According to an embodiment of the disclosure, the performing of, when the packet duplication transmission is activated, the packet duplication transmission by using the RLC entity set to be used for uplink packet duplication transmission may include: receiving information indicating packet duplication activation or deactivation for the RLC entity set to be used for the uplink packet duplication transmission through a medium access control control element (MAC CE), from the base station; and activating the packet duplication transmission when the information indicating the packet duplication activation is received.

According to an embodiment of the disclosure, the information about the RLC entity to be used for the uplink packet duplication transmission may include at least one of a list of the RLC entities to be used for the uplink packet duplication transmission, an ID of the RLC entity, a logical channel ID, or a combination of a logical channel ID and a cell group ID.

According to an embodiment of the disclosure, the performing of, when the packet duplication transmission is activated, packet duplication transmission by using the RLC entity set to be used for uplink packet duplication transmission may include: receiving information indicating packet duplication activation or deactivation for the radio bearer, through a medium access control control element (MAC CE), from the base station; and activating the packet duplication transmission when the information indicating packet duplication activation is received.

According to an embodiment of the disclosure, a user equipment (UE) for controlling packet duplication transmission in a wireless communication system includes: a transceiver; a memory; and at least one processor configured to receive a packet duplication configuration for a radio bearer through a radio resource control (RRC) message, from a base station; determine whether each of a plurality of radio link control (RLC) entities is configured to be used for uplink packet duplication transmission; and perform, when packet duplication transmission is activated, packet duplication transmission by using a RLC entity set to be used for uplink packet duplication transmission.

According to an embodiment of the disclosure, the at least one processor may be further configured to receive information indicating packet duplication activation or deactivation for the plurality of RLC entities through a medium access control control element (MAC CE) from the base station; and determine whether each of the plurality of RLC entities is configured to be used for uplink packet duplication transmission, based on the information indicating the packet duplication activation or deactivation.

According to an embodiment of the disclosure, the information indicating the packet duplication activation or deactivation may include radio bearer identification information including at least one of a radio bearer index or a radio bearer ID, and a plurality of fields respectively corresponding to the plurality of RLC entities.

According to an embodiment of the disclosure, the plurality of fields respectively corresponding to the plurality of RLC entities may be at least one of a plurality of fields respectively corresponding to all RLC entities set in the radio bearer, and a plurality of fields respectively corresponding to the RLC entities set to be used for uplink packet duplication transmission in the packet duplication configuration for the radio bearer.

According to an embodiment of the disclosure, the RRC message may include information about the RLC entity to be used among uplink packet duplication transmission for the plurality of RLC entities, and the at least one processor may be further configured to determine whether each of the plurality of RLC entities is configured to be used for uplink packet duplication transmission, based on the information about the RLC entity to be used for uplink packet duplication transmission.

According to an embodiment of the disclosure, the at least one processor may be further configured to receive information indicating packet duplication activation or deactivation for the RLC entity set to be used for the uplink packet duplication transmission through a medium access control control element (MAC CE), from the base station, and activate the packet duplication transmission when the information indicating the packet duplication activation is received.

According to an embodiment of the disclosure, the information about the RLC entity to be used for the uplink packet duplication transmission for the plurality of RLC entities may include at least one of a list of the RLC entities to be used for the uplink packet duplication transmission, an ID of the RLC entity, a logical channel ID, or a combination of a logical channel ID and a cell group ID.

Hereinafter, embodiments of the disclosure will be described in detail with reference to the accompanying drawings. When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some components of the accompanying drawings may be exaggeratedly shown, omitted, or schematically shown. Also, the sizes of the components do not completely reflect their actual sizes. The same or corresponding components in the drawings are assigned like reference numerals.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like components throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more central processing units (CPUs) in a device or a security multimedia card. Also, in the embodiments, the 'portion', 'module' or 'unit' may include one or more processors.

In the following descriptions, the terms used to identify access nodes, the terms indicating network entities, the terms indicating messages, the terms indicating interfaces between network objects, the terms indicating various identification information, etc. are examples for convenience of description. Accordingly, the disclosure is not limited to these terms, and other terms having the equivalent technical meaning may be used.

Hereinafter, for convenience of description, the disclosure uses terms and names defined in standards for $3^{rd}$ generation partnership project long term evolution (3GPP LTE), or modified terms or names of the terms and names. However, the disclosure is not limited by the terms and names, and may also be applied in the same way to systems based on other standards. In the disclosure, for convenience of descriptions, Evolved Node B (eNB) and Next Generation Node B (gNB) may be interchangeably used. That is, a base station mentioned as an eNB may indicate a gNB. In the disclosure, the term user equipment (UE) may represent various wireless communication devices, as well as cellular phones, narrowband interne of things (NB-IoT) devices, and sensors.

FIG. 1 illustrates a structure of a radio bearer to which packet duplication transmission is configured according to an embodiment.

Packet duplication transmission means duplicating a packet and transmitting the duplicated packets to a plurality of paths by a transmitter.

Referring to FIG. 1, in a radio bearer structure according to an embodiment, four RLC entities of RLC1 1a-20, RLC2 1a-30, RLC3 1a-40, and RLC4 1a-50 are connected to a packet data convergence protocol (PDCP) entity PDCP1 1a-10 to support a plurality of paths. However, the radio bearer structure is only an example, and the number of RLC entities connected to a PDCP entity is not limited. Also, a base station may configure a radio bear structure according to a wireless link and a network structure.

In the radio bearer structure according to an embodiment, a layer of performing duplication of packets may be the PDCP entity 1a-10, and the PDCP entity 1a-10 may perform packet duplication and then transmit the duplicated packets to two or more different RLC entities to enable the RLC entities to perform packet transmission independently. Because a radio bearer includes a single PDCP entity regardless of packet duplication, a PDCP entity may correspond to a radio bearer identifier (ID). According to an embodiment, the radio bearer including the PDCP entity PDCP1 1a-10 may be a data radio bearer (DRB) or a signaling radio bearer (SRB).

The RLC entities RLC1 1a-20, RLC2 1a-30, RLC3 1a-40, and RLC4 1a-50 may be classified into a primary RLC entity 1a-20 and secondary RLC entities 1a-30, 1a-40, and 1a-50, according to their uses. The primary RLC entity 1a-20 may always perform packet transmission regardless of activation of packet duplication. The secondary RLC entities 1a-30, 1a-40, and 1a-50 may perform packet transmission only when packet duplication is activated. Also, the secondary RLC entities 1a-30, 1a-40, and 1a-50 may not participate in uplink packet transmission according to a setting method.

In the case in which split bearers are applied, a transmitter may transmit a packet only to a primary RLC entity when data to be transmitted is less than or equal to (or less than) a specific threshold value, and, when the data is more than (or more than or equal to) the specific threshold value, the transmitter may transmit the packet to all of the primary RLC entity and secondary RLC entities.

Settings about detailed operations described above may be included in at least one of a radio bearer configuration, a RLC bearer configuration, a PDCP configuration, and an RLC configuration of a radio resource control (RRC) configuration message and transmitted to a UE.

Figure 2:
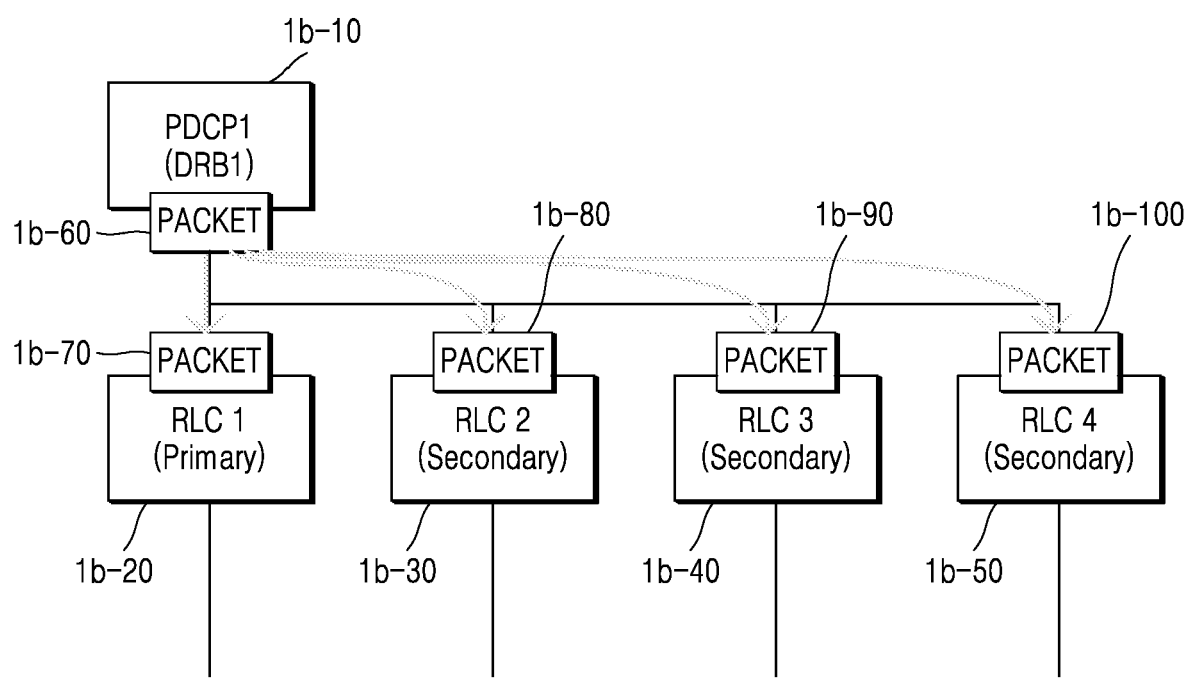
FIG. 2 is a diagram for describing an operation of packet duplication transmission, according to an embodiment.

FIG. 2 is a diagram for describing an operation of packet duplication transmission according to an embodiment.

In the following description, a structure of a radio bearer to which packet duplication is set is assumed to be the structure of the radio bearer shown in FIG. 1.

Referring to FIG. 2, according to an embodiment, when packet duplication transmission is configured and activated, a transmitter PDCP entity 1b-10 may duplicate a packet 1b-60 to a plurality of duplicated packets 1b-70, 1b-80, 1b-90, and 1b-100, and transmit the duplicated packets 1b-70, 1b-80, 1b-90, and 1b-100 to all RLC entities 1b-20, 1b-30, 1b-40, and 1b-50 configured in advance. The RLC entities 1b-20, 1b-30, 1b-40, and 1b-50 may operate in independent modes. When the RLC entities 1b-20, 1b-30, 1b-40, and 1b-50 operate in a RLC acknowledged mode (AM), the RLC entities 1b-20, 1b-30, 1b-40, and 1b-50 may perform an ARQ (Automatic Repeat reQuest) operation independently.

As shown in FIG. 2, when the four RLC entities 1b-20, 1b-30, 1b-40, and 1b-50 have been configured in the radio bearer, the transmitter PDCP entity 1b-10 may generate four duplicated packets for one packet and transmit the four duplicated packets to the four RLC entities 1b-20, 1b-30, 1b-40, and 1b-50, respectively.

Figure 3:
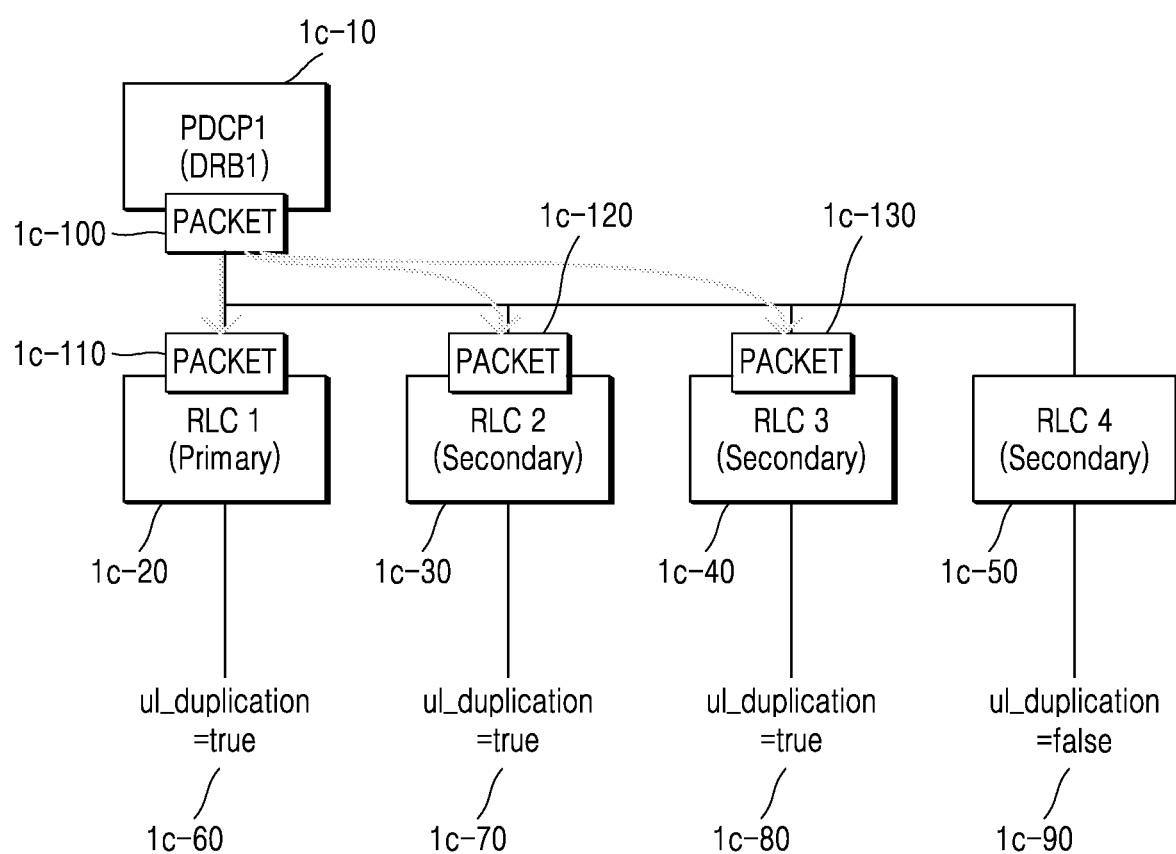
FIG. 3 is a diagram for describing an operation of packet duplication transmission, according to another embodiment.

FIG. 3 is a diagram for describing an operation of packet duplication transmission according to another embodiment.

Performing packet duplication and then sending the same duplicated packets to a plurality of paths uses a radio resource in duplicate, which may cause inefficiency in use of radio resources. Accordingly, to reduce such inefficiency, it may be necessary to adjust the number of packets to be duplicated upon radio network management. Also, downlink packet duplication transmission that is controlled completely by a base station and uplink packet duplication transmission that is controlled by a UE according to a setting of a base station may be performed by using different numbers of RLC entities, respectively.

Referring to FIG. 3, some RLC entities among RLC entities configured in advance may perform packet duplication. According to an embodiment, although a transmitter PDCP entity 1c-10 duplicates a packet 1c-100, the transmitter PDCP entity 1c-10 may use three RLC entities RLC 1 1c-20, RLC2 1c-30, and RLC3 1c-40 of four RLC entities 1c-20, 1c-30, 1c-40, and 1c-50 for packet duplication, without using all of the four RLC entities 1c-20, 1c-30, 1c-40, and 1c-50. Accordingly, the RLC entity RLC4 1c-50 may not participate in packet duplication transmission. Whether each RLC entity will participate in packet duplication transmission may be configured by a base station. According to RLC configurations for individual RLC entities, an ul-duplication field set to true may represent that the corresponding RLC entity participates in packet duplication transmission, and an ul-duplication field set to false may represent that the corresponding RLC entity does not participate in packet duplication transmission.

Whether each RLC entity will participate in packet duplication transmission may be set by another method. For example, a list of RLC entities that are to be used for packet duplication may be designated in a PDCP configuration or a radio bearer configuration and transferred. At this time, the corresponding RLC entity may be designated by specifying a logical channel identifier (LCID). Also, in a dual connectivity or multi connectivity structure, the corresponding RLC entity may be designated by a combination of a logical channel ID and a cell group ID. Further, an ID of a RLC entity (RLC bearer) may be specified.

Whether a RLC entity participates in packet duplication transmission, which is represented by the corresponding ul_duplication field, may change by a packet duplication activation/deactivation message which will be described later with reference to FIGS. 7, 8, and 10. According to another embodiment, a RLC entity to be actually activated and used for packet duplication transmission among RLC entities of which ul_duplication fields have been set to true may be set.

Figure 4:
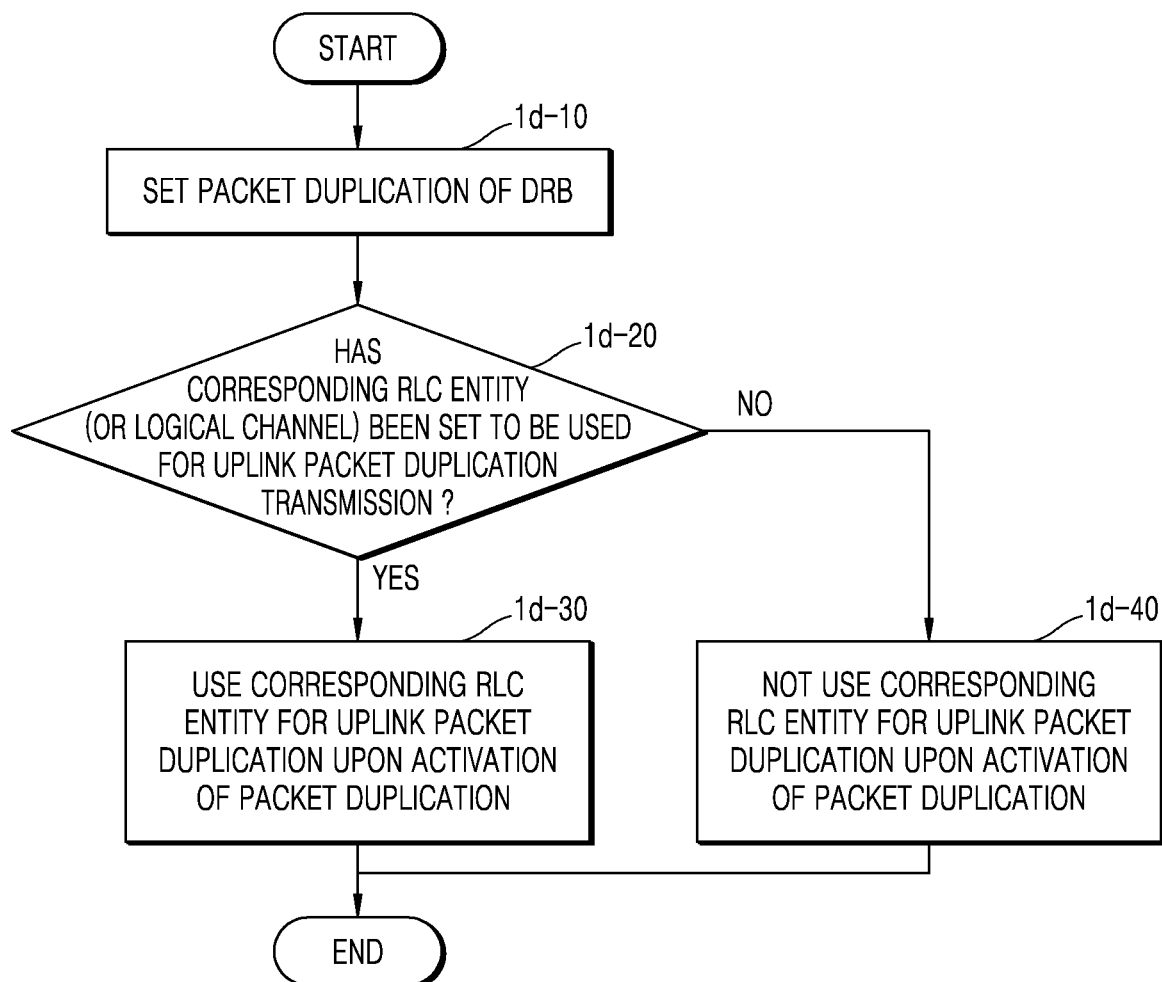
FIG. 4 is a diagram illustrating an operation of performing packet duplication transmission according to an uplink duplication configuration, according to an embodiment.

FIG. 4 is a diagram illustrating an operation of performing packet duplication transmission according to an uplink duplication configuration, according to an embodiment.

In operation 1d-10, packet duplication of a radio bearer may be set. Then, in operation 1d-20, a UE may check a RLC entity(s) set to be used for uplink packet duplication transmission. According to an embodiment, because each RLC entity corresponds to a logical channel, whether each logical channel is configured to be used for uplink packet duplication may be checked. At this time, whether a RLC entity or a logical channel is configured to be used for uplink packet duplication may be determined by checking whether the corresponding ul-duplication field is configured to true or a list of RLC entities to be used for packet duplication, as described above with reference to FIG. 3.

When a RLC entity or a logical channel is configured to be used for uplink packet duplication, the RLC entity may be used for uplink packet duplication upon activation of packet duplication, in operation 1d-30.

When a RLC entity or a logical channel has been not set to be used for uplink packet duplication, the RLC entity may be not used for uplink packet duplication upon activation of packet duplication, in operation 1d-40. In other words, upon activation of packet duplication, a transmitter PDCP entity may transmit duplicated packets to RLC entities that are used for packet duplication activation to thereby perform packet duplication transmission.

Figure 5:
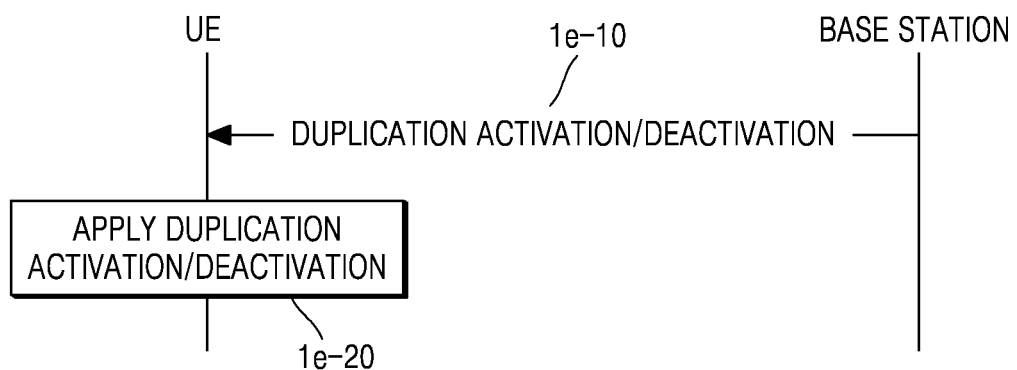
FIG. 5 is a diagram illustrating a method, performed by a base station, for controlling packet duplication activation and deactivation, according to an embodiment.

FIG. 5 is a diagram illustrating a method, performed by a base station, for controlling packet duplication activation and deactivation, according to an embodiment.

Packet duplication transmission may increase consumption of radio resources because the same packet is transmitted by using two or more RLC entities. Accordingly, the packet duplication transmission may cause inefficiency in use of radio sources. Therefore, it may be not preferable to always perform packet duplication. Accordingly, it may be preferable to perform packet duplication transmission as necessary. Causing packet duplication to be actually performed in a radio bearer to which packet duplication is configured is referred to as activation of packet duplication. In contrast, causing packet duplication to not be performed in a radio bearer to which packet duplication is configured is referred to as deactivation of packet duplication.

In operation 1e-10, a base station may transmit a packet duplication activation/deactivation message to a UE. At this time, messages having the same format may be used for both activation and deactivation, and activation and deactivation of packet duplication may be distinguished by values included in the messages. The packet duplication activation/deactivation message may indicate a radio bearer for which packet duplication will be activated or deactivated.

In operation 1e-20, after the UE receives the packet duplication activation/deactivation message, the UE may activate or deactivate packet duplication according to an indication included in the packet duplication activation/deactivation message.

Figure 6:
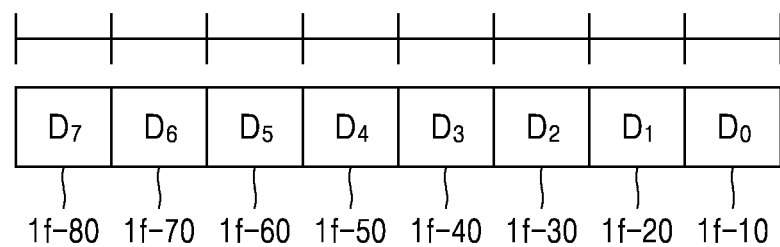
FIG. 6 illustrates a format of a packet duplication activation/deactivation message, according to an embodiment.

Hereinafter, a format of the packet duplication activation/deactivation message will be described in more detail with reference to FIGS. 6 to 10. FIG. 6 illustrates a format of a packet duplication activation/deactivation message according to an embodiment.

Referring to FIG. 6, the packet duplication activation/deactivation message may have a medium access control control element (MAC CE) format configured with 1 byte, in other words, 8 bitmaps. A bit of each bitmap may indicate activation and deactivation states of packet duplication transmission for a specific radio bearer, wherein 1 represents activation and 0 represents deactivation. Also, the 8 bitmaps may indicate packet duplication activation and deactivation states for a maximum of 8 radio bearers. Bearers indicated respectively by bits $D_0$ 1f-10 to $D_7$ 1f-80 may be applied by a preset method. According to an embodiment, the bits may be applied by ascending order of DRB IDs of radio bearers for which RLC entities exist and packet duplication has been set, by a MAC entity that has transmitted the MAC CE. Also, the bits may be applied by ascending order of DRB IDs of radio bearers which use a security key corresponding to a cell group to which the MAC entity that has transmitted the MAC CE belongs, and for which packet duplication has been set.

Figure 7:
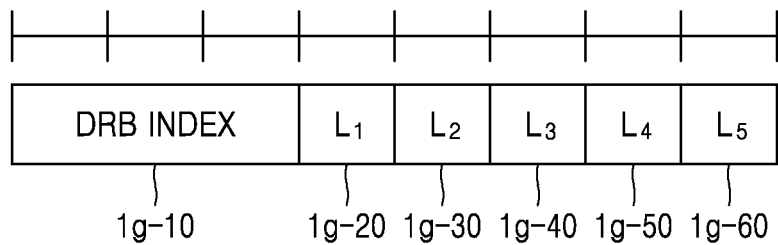
FIG. 7 illustrates a format of a packet duplication activation/deactivation message, according to another embodiment.

FIG. 7 illustrates a format of a packet duplication activation/deactivation message according to another embodiment.

Referring to FIG. 7, the packet duplication activation/deactivation message may have a MAC CE format. According to an embodiment, the packet duplication activation/deactivation message may include a DRB index 1g-10 and Li (i=1, 2, 3, 4, 5) fields 1g-20, 1g-30, 1g-40, 1g-50, and 1g-60 corresponding to RLC entities. The DRB index 1g-10 may be a preset value which may be applied as one of the following values.

specified in a DRM configuration upon a setting by a base station applied in an ascending order of DRB IDs of radio bearers for which packet duplication has been set applied in an ascending order of DRB IDs of radio bearers for which RLC entities exist and packet duplication has been set, by a MAC entity that has transmitted the MAC CE DRB ID values The Li fields 1g-20,1g-30,1g-40,1g-50, and 1g-60 may represent the respective RLC entities, and each of the Li fields 1g-20,1g-30,1g-40,1g-50, and 1g-60 may set whether to use the corresponding RLC entity for packet duplication transmission according to its bit value. For example, a value 1 of a Li field may represent that the corresponding RLC entity is used for packet duplication transmission, and a value 0 of a Li field may represent that the corresponding RLC entity is not used for packet duplication transmission. A Li field may indicate a RLC entity by using a preset value which may be applied as one of the following values.

applied in an ascending (descending) order of LCIDs of a master cell group and then in an ascending (descending) order of LCIDs of a secondary cell group in an ascending order of preset indices corresponding to RLC entities applied in an ascending order of priorities of the corresponding logical channels, and arranged in an ascending order of LCIDs of a master cell group in the case of the same priority As a result of reception of a packet duplication activation/deactivation message, a UE may determine a RLC entity(s) of a DRB, which will be used for packet duplication transmission, and perform packet duplication transmission.

All RLC entities set in the DRB may have Li fields. In this case, in the radio bearer of FIG. 3, all of four RLC entities may have Li fields, and each of the four RLC entities may be set about whether to be used for packet duplication transmission. According to another embodiment, only a RLC device(s) of which an ul_duplication field as described above with reference to FIG. 3 has been set to true may have the corresponding Li field. In this case, in the radio bearer of FIG. 3, three RLC entities of which up_duplication fields have been set to true may have Li fields, and may be set about whether to be used for packet duplication transmission.

Figure 8:
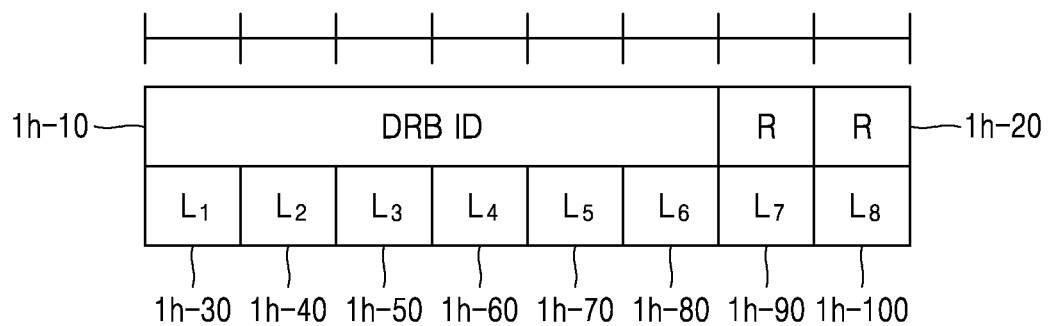
FIG. 8 illustrates a format of a packet duplication activation/deactivation message, according to another embodiment.

FIG. 8 illustrates a format of a packet duplication activation/deactivation message according to another embodiment.

Referring to FIG. 8, the packet duplication activation/deactivation message may have a MAC CE format. According to an embodiment, the packet duplication activation/deactivation message may include a DRB ID 1h-10 and Li (i=1, 2, 3, 4, 5, 6, 7, 8) fields 1h-30, 1h-40, 1h-50, 1h-60, 1h-70, 1h-80, 1h-90, and 1h-100 corresponding to RLC entities. Also, in some cases, the packet duplication activation/deactivation message may include a reserved (R) bit 1h-20.

The Li fields 1h-30,1h-40,1h-50,1h-60, 1h-70, 1h-80, 1h-90, and 1h-100 may represent the respective RLC entities. Also, each of the Li fields 1h-30,1h-40,1h-50,1h-60, 1h-70, 1h-80, 1h-90, and 1h-100 may set whether to use the corresponding RLC entity for packet duplication transmission according to its bit value. For example, a value 1 of a Li field may represent that the corresponding RLC entity is used for packet duplication transmission, and a value 0 of a Li field may represent that the corresponding RLC entity is not used for packet duplication transmission. A Li field may indicate a RLC entity by using a preset value which may be applied as one of the following values.

applied in an ascending (descending) order of LCIDs of a master cell group, and then applied in an ascending (descending) order of LCIDs of a secondary cell group in an ascending order of preset indices corresponding to RLC entities applied in an ascending order of priorities of the corresponding logical channels, and arranged in an ascending order of LCIDs of a master cell group in the case of the same priority As a result of reception of a packet duplication activation/deactivation message, a UE may determine a RLC entity(s) of a DRB, which will be used for packet duplication transmission, and perform packet duplication transmission.

All RLC entities set in the DRB may have Li fields. In this case, in the radio bearer of FIG. 3, all of four RLC entities may have Li fields, and each of the four RLC entities may be set about whether to be used for packet duplication transmission. According to another embodiment of the disclosure, in the radio bearer of FIG. 3, RLC entities of which up_duplication fields described above with reference to FIG. 3 have been set to true may have Li fields. In this case, in the radio bearer of FIG. 3, three RLC entities of which up_duplication fields have been set to true may have Li fields, and may be set about whether to be used for packet duplication transmission.

Figure 9:
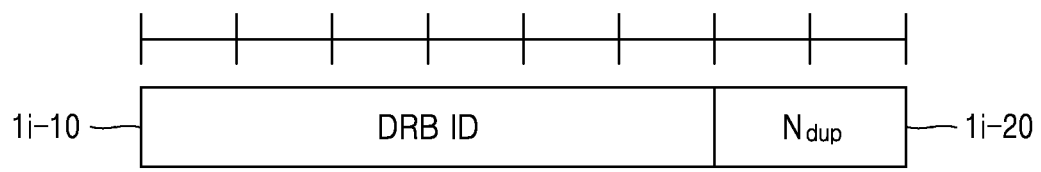
FIG. 9 illustrates a format of a packet duplication activation/deactivation message, according to another embodiment.

FIG. 9 illustrates a format of a packet duplication activation/deactivation message according to another embodiment.

Referring to FIG. 9, the packet duplication activation/deactivation message may have a MAC CE format. According to an embodiment, the packet duplication activation/deactivation message may include a DRB ID 1i-10, and an $N_{dup}$ field 1i-20 representing the number of RLC entities to be used for uplink packet duplication. The DRB ID 1i-10 may represent an ID of a DRB to which activation/deactivation of packet duplication transmission will be applied. A UE may receive the MAC CE, and then perform packet duplication transmission by using RLC entities corresponding to a number set in the $N_{dup}$ field 1i-20. RLC entities to be used for packet duplication transmission among RLC entities set for the UE may be selected by a preset method which is one of the following methods.

applied in an ascending (descending) order of LCIDs of a master cell group, and then applied in an ascending (descending) order of LCIDs of a secondary cell group to select $Na_{dup}$ RLC entities select $Na_{dup}$ RLC entities in an ascending order of preset indices corresponding to RLC entities applied in an ascending order of priorities of the corresponding logical channels, and select $Na_{dup}$ RLC entities in an ascending order of LCIDs of a master cell group in the case of the same priority As a result of reception of a packet duplication activation/deactivation message, a UE may determine a RLC device(s) of a DRB, which will be used for packet duplication transmission, and perform packet duplication transmission.

Figure 10:
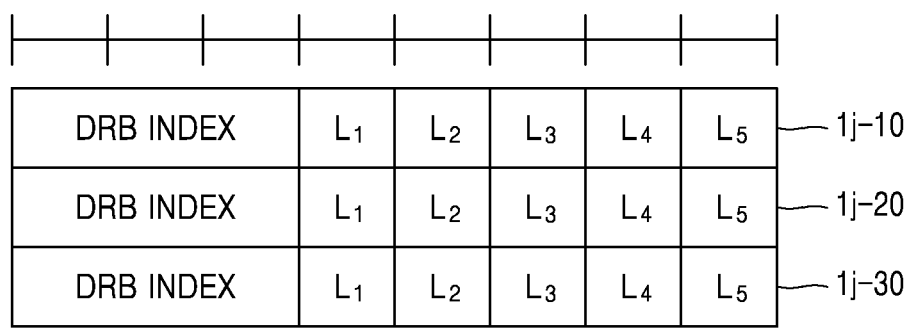
FIG. 10 illustrates a format of a packet duplication activation/deactivation message, according to another embodiment.

FIG. 10 illustrates a format of a packet duplication activation/deactivation message according to another embodiment.

Referring to FIG. 10, the packet duplication activation/deactivation message may have a MAC CE format. The formats of the packet duplication activation/deactivation messages shown in FIGS. 7 to 9 have been described to indicate packet duplication activation/deactivation for a radio bearer, however, the messages may be used to set packet duplication for several radio bearers.

In FIG. 10, three messages j-10, 1j-20, and 1j-30 having formats each including a DRB index and Li fields corresponding to RLC entities as descried above with reference to FIG. 7 may overlap to construct a MAC CE. However, this is only an example, and the number of overlapping MAC CEs is not limited. The number of overlapping MAC CEs may have been set in advance, may correspond to the number of radio bearers for which packet duplication has been set, or may be determined variably for a radio bearer for which a base station intends to set packet duplication. When a variable-size MAC CE format is used, an L field (length field) of a MAC subheader may need to be included.

In this case, packet duplication may be allowed for a RLC entity of a radio bearer indicated by a DRB index. Also, the DRM index may be a preset value which may be applied as one of the following values.

specified in a DRM configuration upon a setting by a base station applied in an ascending order of DRB IDs of radio bearers for which packet duplication has been set applied in an ascending order of DRB IDs of radio bearers for which RLC entities exist and packet duplication has been set, by a MAC entity that has transmitted the MAC ME DRB ID values The Li fields may represent the respective RLC entities, and each of the Li fields may set whether to use the corresponding RLC entity for packet duplication transmission according to its bit value. For example, a value 1 of a Li field may represent that the corresponding RLC entity is used for packet duplication transmission, and a value 0 of a Li field may represent that the corresponding RLC entity is not used for packet duplication transmission. A Li field may indicate a RLC entity by using a preset value which may be applied as one of the following values.

applied in an ascending (descending) order of LCIDs of a master cell group and then in an ascending (descending) order of LCIDs of a secondary cell group in an ascending order of preset indices corresponding to RLC entities applied in an ascending order of priorities of the corresponding logical channels, and arranged in an ascending order of LCIDs of a master cell group in the case of the same priority.

As a result of reception of a packet duplication activation/deactivation message, a UE may determine a RLC device(s) of a DRB, which will be used for packet duplication transmission, and perform packet duplication transmission.

All RLC entities set in the DRB may have Li fields. In this case, in the radio bearer of FIG. 3, all of four RLC entities may have Li fields and each of the four RLC entities may be set about whether to be used for packet duplication transmission. According to another embodiment, a RLC device(s) for which an ul_duplication field described above with reference to FIG. 3 has been set to true may have the corresponding Li field. In this case, in the radio bearer of FIG. 3, three RLC entities of which up_duplication fields have been set to true may have Li fields, and may be set about whether to be used for packet duplication transmission.

The format of the message shown in FIG. 10 is the same as the MAC CE format shown in FIG. 7, however, the message format shown in FIG. 8 or 9 may be used. Also, a packet duplication activation/deactivation message for a general single radio bearer may be used.

Figure 11:
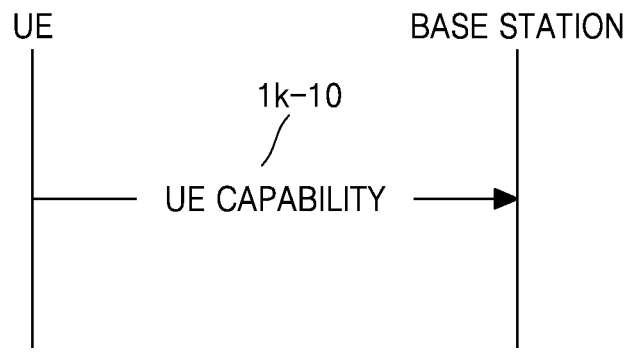
FIG. 11 is a diagram illustrating a method, performed by a user equipment (UE), according to an embodiment, of informing a base station of whether the UE has a packet duplication activation function.

FIG. 11 is a diagram illustrating a method, performed by a UE according to an embodiment, of informing a base station of whether the UE has a packet duplication activation function.

Figure 12:
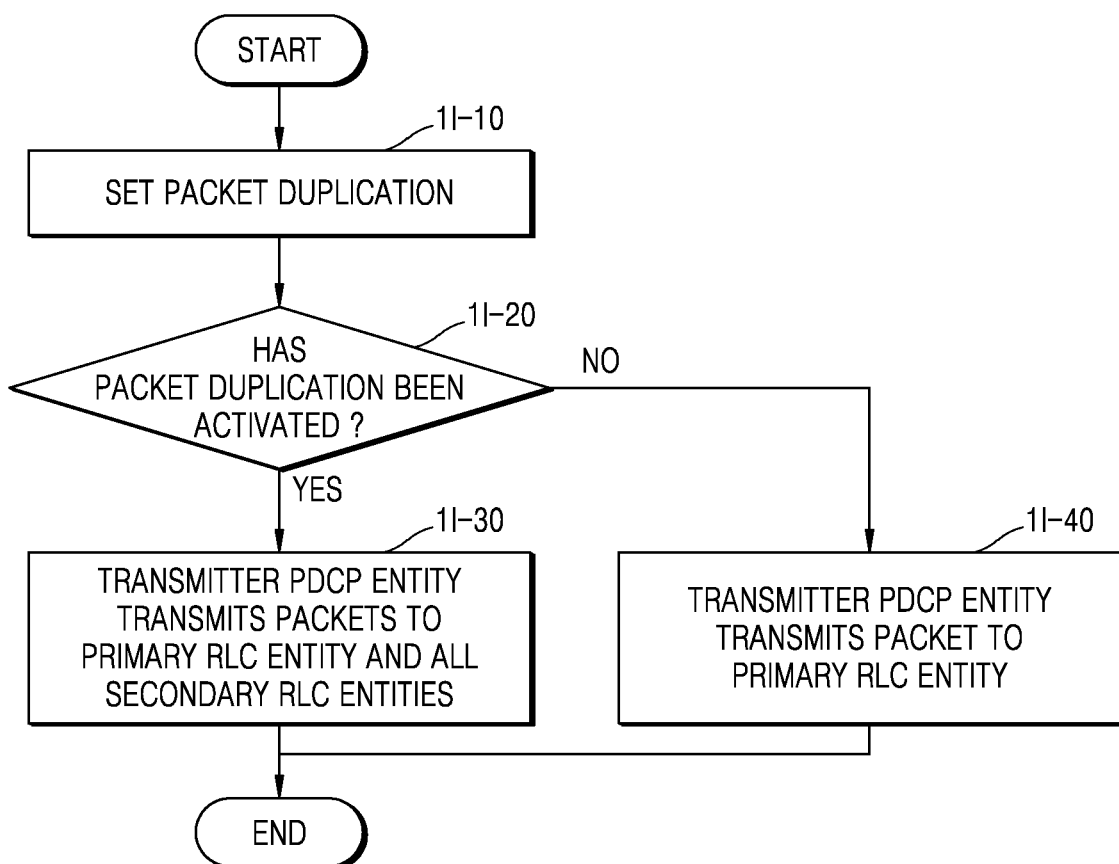
FIG. 12 is a diagram illustrating an operation of performing packet duplication transmission, according to an embodiment.

Because packet duplication transmission is used to reduce latency or raise reliability such as packet loss probability, a specific UE may support such a packet duplication transmission function. In this case, the UE may inform a base station of whether the UE supports a packet duplication transmission function. At this time, the UE may include information about whether a packet duplication transmission function is supported in a UE capability message 1k-10. Also, the UE capability message 1k-10 may include at least one piece of information related to packet duplication transmission of the UE. The information may be as follows.

a maximum number of RLC entities capable of performing packet duplication in a single radio bearer a maximum number of RLC entities capable of being set in a single radio bearer whether packet duplication transmission using three RLC entities or more is supportable a maximum number of radio bearers to which packet duplication transmission using three RLC entities or more may be set FIG. 12 is a diagram illustrating an operation of performing packet duplication transmission according to an embodiment.

Referring to FIG. 12, a plurality of RLC entities may be set for a radio bearer, and the RLC entities may be configured with a primary RLC entity and secondary RLC entities, as shown in FIG. 1. In this case, in response to activation of packet duplication, a UE may determine a RLC device(s) for which packet duplication will be set.

In operation 1l-10, when packet duplication for a certain radio bearer is set, the process may proceed to operation 1l-20 to determine whether packet duplication transmission of the corresponding bearer has been actually activated.

When it is determined that packet duplication transmission has been actually activated, the process may proceed to operation 1l-30 so that a transmitter PDCP entity may duplicate a packet and transmit the duplicated packets to the primary RLC entity and all secondary RLC entities set in advance.

When it is determined that packet duplication transmission has been not actually activated, the process may proceed to operation 1l-40 so that the transmitter PDCP entity may transmit the packet to the primary RLC entity without duplicating the packet.

In the case in which split bearers are applied, the transmitter PDCP entity may transmit the packet only to the primary RLC entity when data to be transmitted is less than or equal to (or less than) a specific threshold value, and, when the data is more than (or more than or equal to) the specific threshold value, the transmitter PDCP entity may transmit the packet to all of the primary RLC entity and secondary RLC entities. However, when it is determined that packet duplication transmission has been not actually activated, the transmitter PDCP entity may not duplicate the packet.

Figure 13:
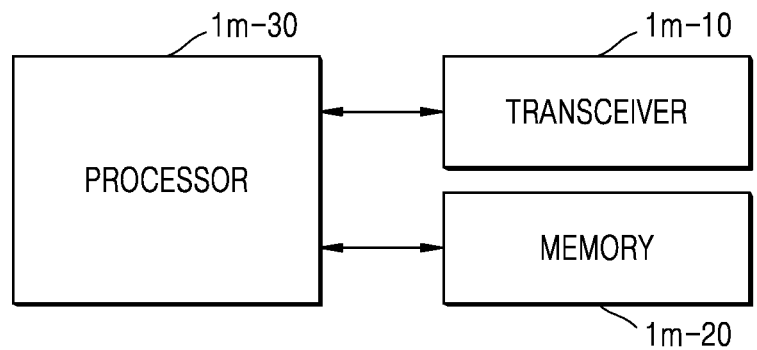
FIG. 13 is a block diagram illustrating an internal structure of a UE according to an embodiment.

FIG. 13 is a block diagram illustrating an internal structure of a UE according to an embodiment.

Referring to FIG. 13, the UE may include a transceiver 1m-10, a memory 1m-20, and a processor 1m-30. The transceiver 1m-10, the memory 1m-20, and the processor 1m-30 of the UE may operate according to a communication method of the UE as described above. However, components of the UE are not limited to the above-mentioned components. For example, the UE may include more or less components that those mentioned above. Also, the transceiver 1m-10, the memory 1m-20, and the processor 1m-30 may be implemented in a form of a single chip.

The transceiver 1m-10 may transmit and receive a signal to and from another network entity, for example, a base station. Herein, the signal may include control information and data. To transmit and receive signals, the transceiver 1m-10 may be configured with an RF transmitter for up-converting a frequency of a signal to be transmitted and amplifying the signal, and an RF receiver for low-noise amplifying a received signal and down-converting a frequency of the received signal. However, the RF transmitter and RF receiver are an embodiment of the transceiver 1m-10, and components of the transceiver 1m-10 are not limited to the RF transmitter and the RF receiver.

Also, the transceiver 1m-10 may receive a signal through a wireless channel, output the signal to the processor 1m-30, and transmit a signal output from the processor 1m-30 through the wireless channel. For example, the transceiver 1m-10 may receive system information from a base station, and receive a synchronization signal or a reference signal.

The memory 1m-20 may store programs and data required for operations of the UE. Also, the memory 1m-20 may store control information or data included in signals obtained by the UE. For example, the memory 1m-20 may store information transmitted/received through the transceiver 1m-10, and information generated by the processor 1m-30. The memory 1m-20 may be configured with storage media, such as read only memory (ROM), random access memory (RAM), a hard disc, compact disc-read only memory (CD-ROM), and a digital versatile disc (DVD), or a combination of the storage media.

The processor 1m-30 may control a series of processes such that the UE operates according to the above-described embodiments. For example, the processor 1m-30 may control signal flows between blocks to perform operations according to the above-described flowchart. Also, the processor 1m-30 may include a circuit or an application-specific integrated circuit.

Figure 14:
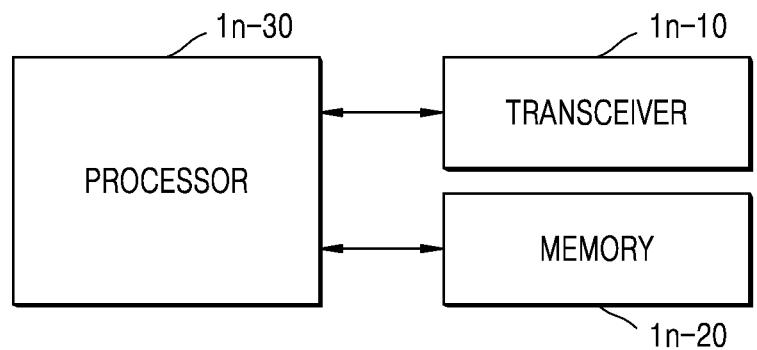
FIG. 14 is a block diagram illustrating a configuration of a base station according to an embodiment.

FIG. 14 is a block diagram illustrating a configuration of a base station according to an embodiment.

Referring to FIG. 14, the base station may include a transceiver 1n-10, a memory 1n-20, and a processor 1n-30. The transceiver 1n-10, the memory 1n-20, and the processor 1n-30 of the base station may operate according to a communication method of the base station as described above. However, components of the base station are not limited to the above-mentioned components. For example, the base station may include more or less components that those mentioned above. The transceiver 1n-10, the memory 1n-20, and the processor 1n-30 may be implemented in a form of a single chip.

The transceiver 1n-10 may transmit and receive a signal to and from another network entity, for example, a UE. The signal may include control information and data. To transmit and receive signals, the transceiver 1n-10 may be configured with an RF transmitter for up-converting a frequency of a signal to be transmitted and amplifying the signal, and an RF receiver for low-noise amplifying a received signal and down-converting a frequency of the received signal. However, the RF transmitter and the RF receiver are an embodiment of the transceiver 1n-10, and components of the transceiver 1n-10 are not limited to the RF transmitter and the RF receiver.

Also, the transceiver 1n-10 may receive a signal through a wireless channel, output the signal to the processor 1n-30, and transmit a signal output from the processor 1n-30 through the wireless channel. For example, the transceiver 1n-10 may transmit system information to the UE, and transmit a synchronization signal or a reference signal to the UE.

The memory 1n-20 may store programs and data required for operations of the base station. Also, the memory 1n-20 may store control information or data included in a signal acquired by the base station. For example, the memory 1n-20 may store information transmitted/received through the transceiver 1n-10, and information generated by the processor 1n-30. The memory 1n-20 may be configured with storage media, such as ROM, RAM, a hard disc, CD-ROM, and a DVD, or a combination of the storage media.

The processor 1n-30 may control a series of processes such that the base station operates according to the above-described embodiments of the disclosure. Also, the processor 1n-30 may include a circuit or an application-specific integrated circuit.

Figure 15:
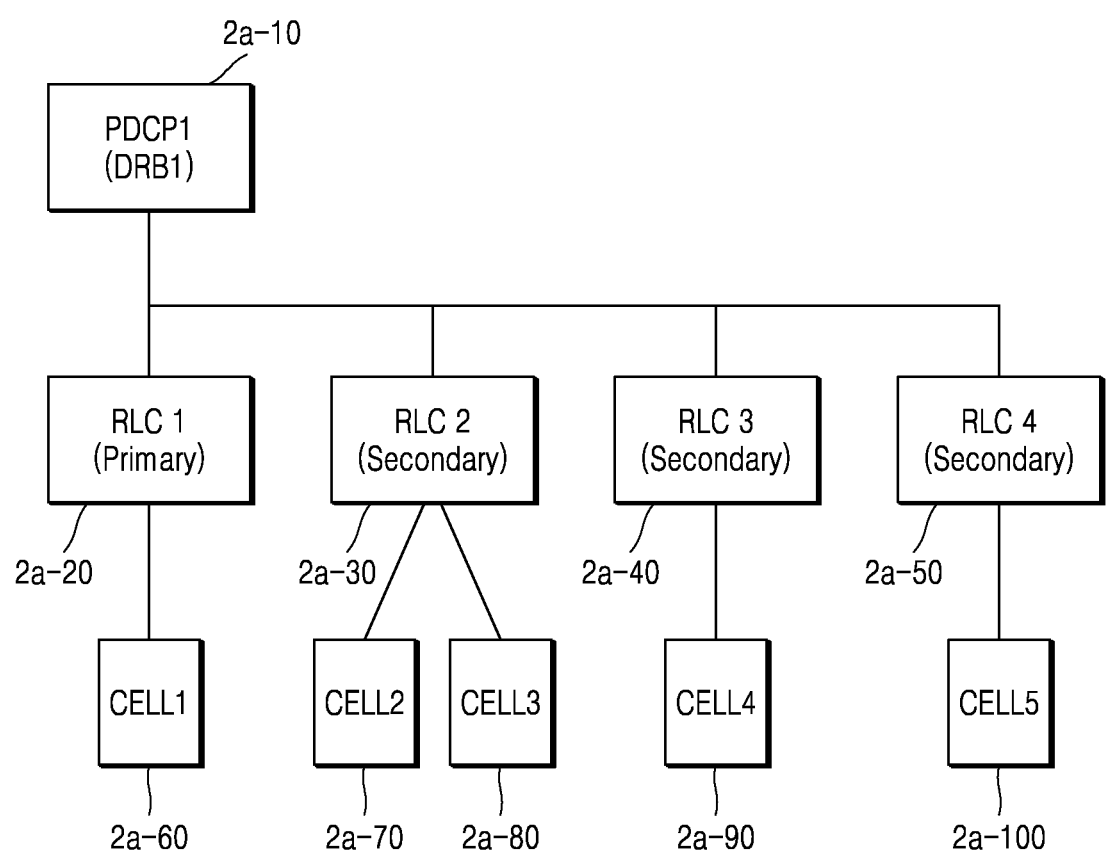
FIG. 15 illustrates a structure of a radio bearer to which packet duplication transmission is set, according to another embodiment.

FIG. 15 illustrates a structure of a radio bearer to which packet duplication transmission is set according to another embodiment.

Packet duplication transmission means duplicating a packet and transmitting the duplicated packets to a plurality of paths in a transmitter.

Referring to FIG. 15, in a radio bearer structure according to an embodiment, four RLC entities of RLC1 2a-20, RLC2 2a-30, RLC3 2a-40, and RLC4 2a-50 are connected to a PDCP entity PDCP1 2a-10 to support a plurality of paths. However, the radio bearer structure is only an example, and the number of RLC entities connected to a PDCP entity is not limited. Also, a base station may set a radio bear structure according to a wireless link and a network structure.

In the radio bearer structure according to an embodiment, a layer of performing duplication of packets may be the PDCP entity 2a-10, and the PDCP entity 2a-10 may perform packet duplication and then transmit the duplicated packets to two or more different RLC entities to enable the RLC entities to perform packet transmission independently. Because a radio bearer includes a PDCP entity regardless of packet duplication, a PDCP entity may correspond to a radio bearer ID. According to an embodiment, the radio bearer including the PDCP entity PDCP1 2a-10 may be a DRB or a SRB.

The RLC entities RLC1 2a-20, RLC2 2a-30, RLC3 2a-40, and RLC4 2a-50 may be classified into a primary RLC entity 2a-20 and secondary RLC entities 2a-30, 2a-40, and 2a-50, according to their uses. The primary RLC entity 2a-20 may always perform packet transmission regardless of activation of packet duplication. Also, the secondary RLC entities 2a-30, 2a-40, and 2a-50 may perform packet transmission in response to activation of packet duplication. Also, the secondary RLC entities 2a-30, 2a-40, and 2a-50 may not participate in uplink packet transmission according to a setting method.

In the case in which split bearers are applied, a transmitter may transmit a packet only to a primary RLC entity when data to be transmitted is less than or equal to (or less than) a specific threshold value, and, when the data is more than (or more than or equal to) the specific threshold value, the transmitter may transmit the packet to all of the primary RLC entity and secondary RLC entities.

Packet duplication transmission may be used for a purpose of increasing transmission probability by sending packets of the same information to different paths. Accordingly, in the case in which packets to be transmitted to different RLC entities are transmitted to the same MAC PDU, the effect may not be obtained. Therefore, by restricting cells that are usable by RLC entities, packets to be transmitted to different RLC entities may be prevented from being transmitted to the same MAC PDU.

Referring to FIG. 15, the RLC entity RLC1 2a-20 may use only Cell1 2a-60, the RLC entity RLC2 2a-30 may use only Cell2 2a-70 and Cell3 2a-80, the RLC entity RLC3 2a-40 may use only Cell4 2a-90, and the RLC entity RLC4 may use only Cell5 2a-100. Each RLC entity may be mapped to a logical channel, and, when a logical channel is established, a list of cells that are usable by the logical channel may be set. A list of cells that are usable by each logical channel is called a cell restriction. A cell restriction may be applied by a method in which only a RLC entity, corresponding a logical channel configured to use the corresponding cell in a logical channel prioritization (LCP) operation, participates the cell restriction after a UE is allocated an uplink resource.

Settings about detailed operations described above may be included in at least one of a radio bearer configuration, a RLC bearer configuration, a PDCP configuration, and an RLC configuration of a RRC configuration message and transmitted to a UE.

Figure 16:
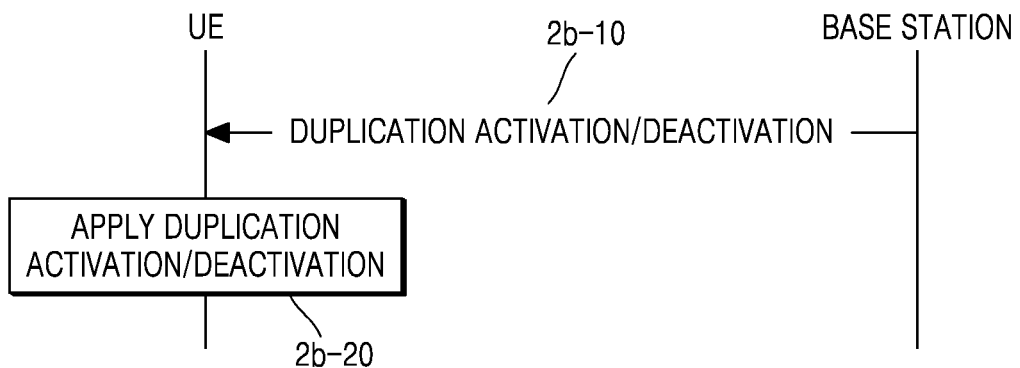
FIG. 16 is a diagram illustrating a method, performed by a base station, of controlling packet duplication activation and deactivation, according to another embodiment.

FIG. 16 is a diagram illustrating a method, performed by a base station, of controlling packet duplication activation and deactivation according to another embodiment.

Packet duplication transmission may increase consumption of radio resources because the same packet is transmitted by using two or more RLC entities. Accordingly, the packet duplication transmission may cause inefficiency in use of radio sources. Therefore, it may be not preferable to always perform packet duplication. Accordingly, it may be preferable to perform packet duplication transmission as necessary. Causing packet duplication to be actually performed in a radio bearer to which packet duplication has been set is referred to as activation of packet duplication. In contrast, causing packet duplication to not be performed in a radio bearer to which packet duplication has been set is referred to as deactivation of packet duplication.

In operation 2b-10, a base station may transmit a packet duplication activation/deactivation message to a UE. At this time, messages having the same format may be used for activation and deactivation, and activation and deactivation of packet duplication may be distinguished by values included in the messages. The packet duplication activation/deactivation message may indicate which radio bearer is to be activated or deactivated with respect to packet duplication.

In operation 1b-20, after the UE receives the packet duplication activation/deactivation message, the UE may activate or deactivate packet duplication according to an indication included in the packet duplication activation/deactivation message.

The packet duplication activation/deactivation message may update a packet duplication state in a RRC configuration, or may be transmitted in a form of a packet duplication activation/deactivation MAC CE.

Figure 17:
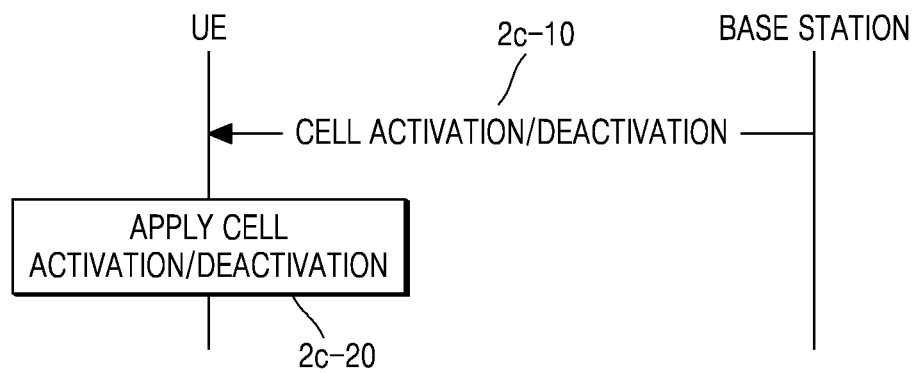
FIG. 17 is a diagram illustrating a method, performed by a base station, of controlling activation and deactivation in cell carrier aggregation, according to an embodiment.

FIG. 17 illustrates a method, performed by a base station, of controlling activation and deactivation in cell carrier aggregation according to an embodiment.

When two cells or more are used in carrier aggregation, a UE may need to continuously use transceivers of the cells, which may increase power consumption. Accordingly, when a UE does not need to use a plurality of cells, a base station may deactivate cells of the UE. Also, when a specific cell is not used for data transmission/reception for a predefined time period, the base station may determine that the corresponding cell does not need to be used, and deactivate the cell.

In operation 2c-1, the base station may transmit a cell activation/deactivation message to the UE to activate/deactivate some cells. In both activation/deactivation by the base station through message transmission and deactivation by a determination of the UE, the UE may participate in activation and deactivation of SCell, not PCell or PSCell that is essential for a connection to the base station.

In operation 2c-20, when the UE receives a cell activation/deactivation message or does not use a specific cell for transmission/reception for a predefined time period, the UE may apply activation/deactivation of the cell.

Figure 18:
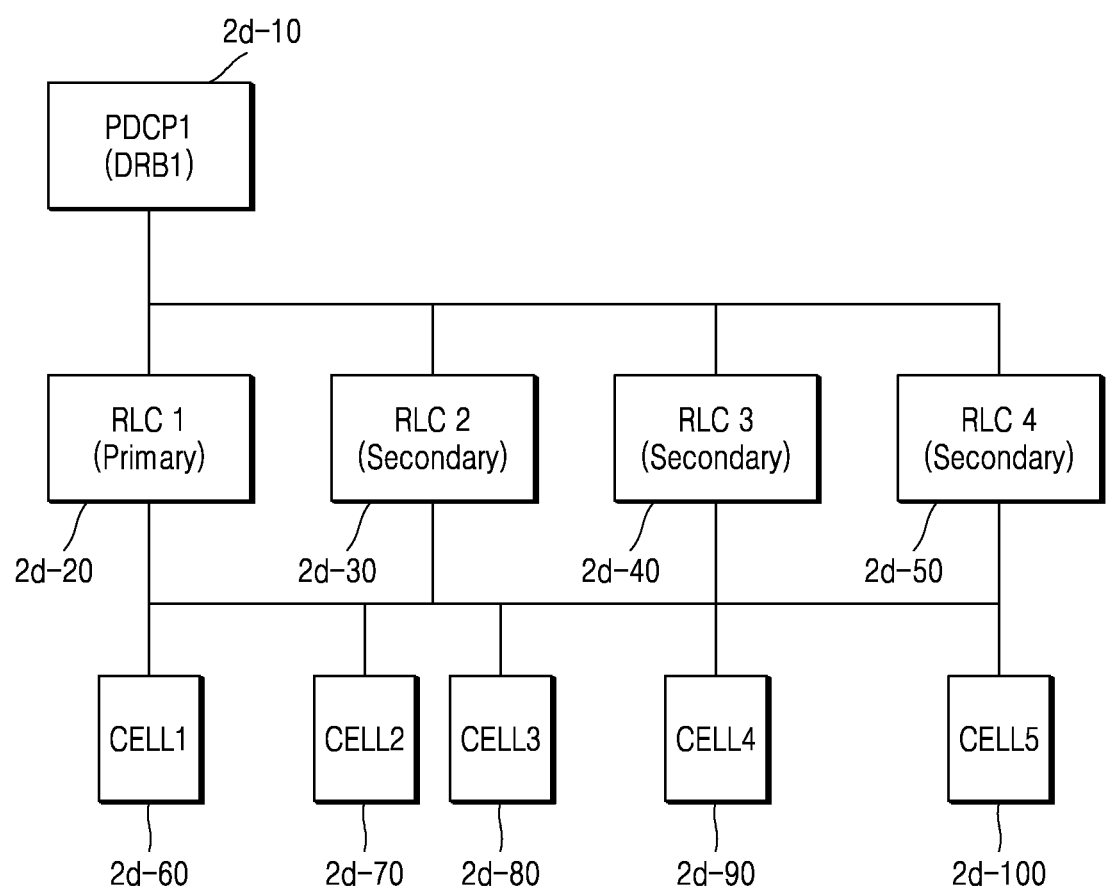
FIG. 18 is a diagram for describing a method of applying a cell configuration when packet duplication transmission, according to an embodiment, is deactivated.

FIG. 18 is a diagram for describing a method of applying a cell configuration when packet duplication transmission according to an embodiment is deactivated.

Referring to FIG. 18, when packet duplication transmission is deactivated by a packet duplication activation/deactivation message, a transmitter PDCP entity 2d-10 may no longer need to duplicate a packet and send the duplicated packets to a plurality of RLC entities. The transmitter PDCP 2d-10 may send a packet to be transmitted to a primary RLC 2d-20, or may send the packet to one of the RLC entities 2d-20, 2d-30, 2d-40, and 2d-50 by a defined split bearer operation. When a UE does not perform packet duplication transmission, it may be unnecessary to apply a list of cells that are usable by each RLC entity described above with reference to FIG. 15. Accordingly, when packet duplication transmission of a radio bearer for which packet duplication has been set is deactivated, all RLC entities of the corresponding radio bearer may use all cells 2d-60, 2d-70, 2d-80, 2d-90, and 2d-100 set in advance without applying restrictions of cell lists, as described above with reference to FIG. 18. In other words, no cell restriction may be applied.

Applying or not applying a cell restriction may be performed in unit of a RLC entity (in other words, in unit of a logical channel) or in unit of a radio bearer to which packet duplication has been applied. According to an embodiment, when a cell restriction is applied in unit of a RLC unit, whether to apply a cell restriction may be determined according to whether packet duplication for the corresponding RLC entity has been activated. That is, a cell restriction may be applied only when the corresponding RLC entity is used for packet duplication transmission. Otherwise, no cell restriction may be applied. According to an embodiment, when a cell restriction is applied in unit of a radio bearer, packet duplication transmission for all secondary RLC entities belonging to the corresponding radio bearer may be deactivated. In this case, no cell restriction may be applied. Also, when only one RLC entity to be used for packet duplication is set or activated, packet duplication transmission may be impossible. In this case, no cell restriction may be applied. According to another embodiment, when a base station transmits a packet duplication activation/deactivation message to deactivate packet duplication transmission of the corresponding radio bearer, no cell restriction may be applied. In addition, when a logical channel for which packet duplication has been activated within the same cell group among logical channels of a radio bearer for which packet duplication has been set is one or less, no cell restriction may be applied.

Figure 19:
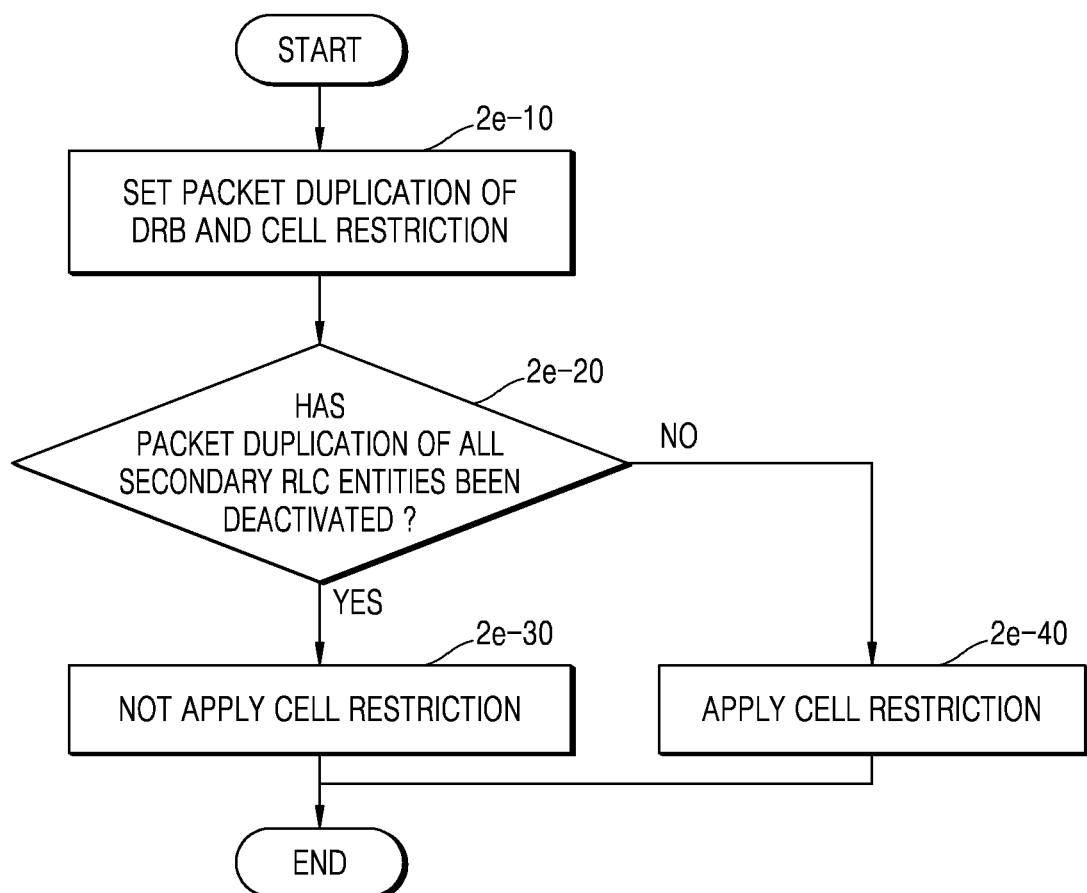
FIG. 19 is a diagram illustrating a method for applying a cell restriction for packet duplication, according to an embodiment.

FIG. 19 is a diagram illustrating a method for applying a cell restriction for packet duplication according to an embodiment.

In operation 2e-10, when packet duplication is set in a radio bearer and a cell restriction for each logical channel is set, a UE may need to determine whether or not to apply cell restrictions of RLC entities.

In operation 2e-20, the UE may determine whether packet duplication of all secondary RLC entities has been deactivated. The UE may determine whether to apply cell restrictions for the RLC entities based on the determination.

When packet duplication of all the secondary RLC entities has been deactivated, the UE may transmit packets to all cells set in a cell group without applying cell restrictions, in operation 2e-30.

When packet duplication of a certain secondary RLC entity has been activated, a cell restriction may be needed. Accordingly, the process may proceed to operation 2e-30 to apply a cell restriction.

In FIG. 19, a DRB has been described as an example, however, the same operation may also be applied to a SRB.

Figure 20:
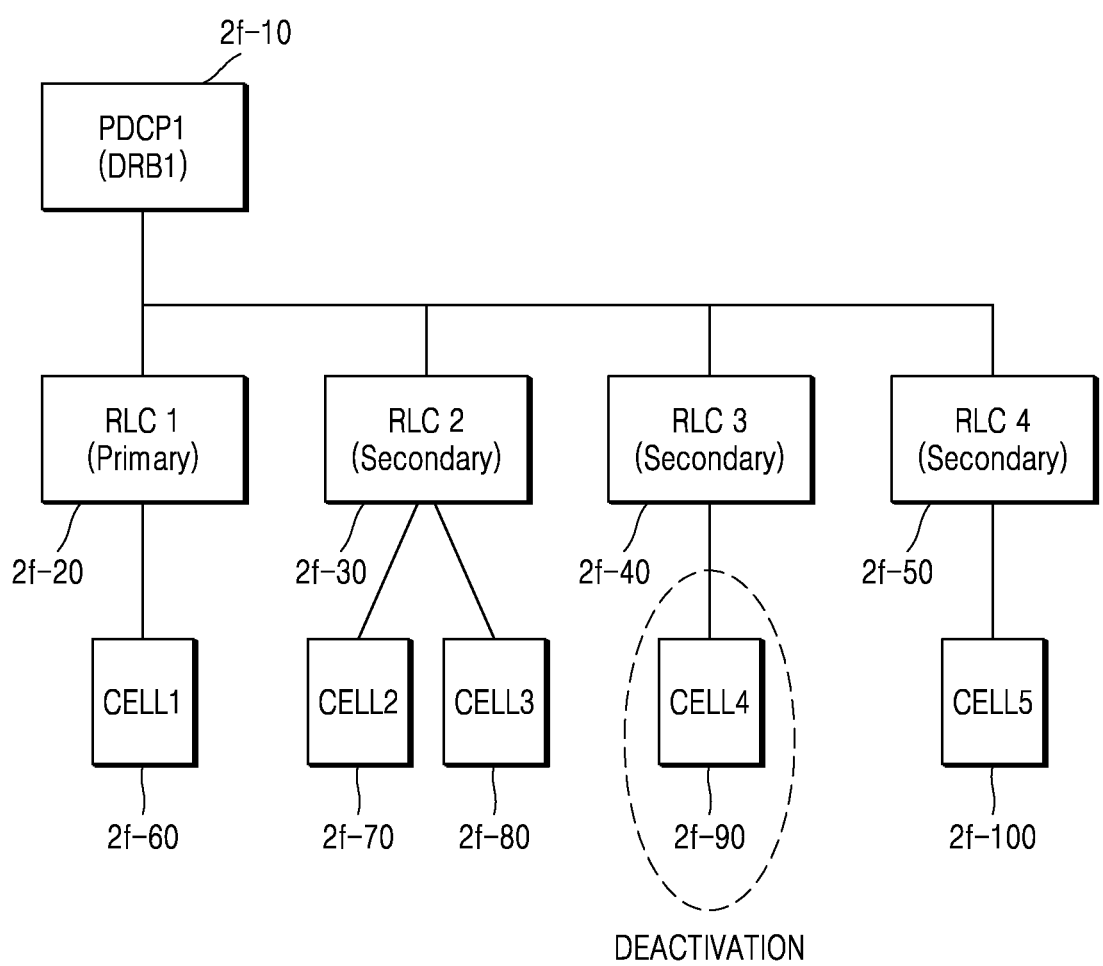
FIG. 20 is a diagram for describing an operation according to cell deactivation in a bearer to which packet duplication is set, according to an embodiment.

FIG. 20 is a diagram for describing an operation according to cell deactivation in a bearer in which packet duplication according to an embodiment has been set.

Referring to FIG. 20, a cell restriction and a radio bearer for packet duplication as described above with reference to FIG. 15 are assumed and described. As described above, for packet duplication transmission, a list of cells that are usable by each logical channel, that is, a cell restriction may be set, and each RLC entity may participate in a LCP operation only with respect to a cell that itself can use to transmit packets. However, when all cells set to be usable by a logical channel are deactivated by a deactivation message, etc., the corresponding RLC entity cannot send any packet.

According to an embodiment, when Cell4 2f-90 set to be usable by RLC3 2f-40 is deactivated, the RLC3 2f-40 may have no cell through which it can send a packet. Accordingly, in this case, a transmitter PDCP entity 2f-10 may no longer send a packet to the RLC3 2f-40. Also, the transmitter PDCP entity 2f-10 may indicate discarding a packet waiting for transmission in the RLC3 2f-40. However, in some cases, the RLC3 2f-40 may maintain the packet for re-transmission. The packet may continue to be re-transmitted without being applied to a cell restriction. According to an embodiment, the RLC3 2f-40 may be re-established. The operation may be identical to an operation that is not used in packet duplication of the RLC3 2f-40, that is, a packet duplication deactivation operation of the RLC3 2f-40.

Figure 21:
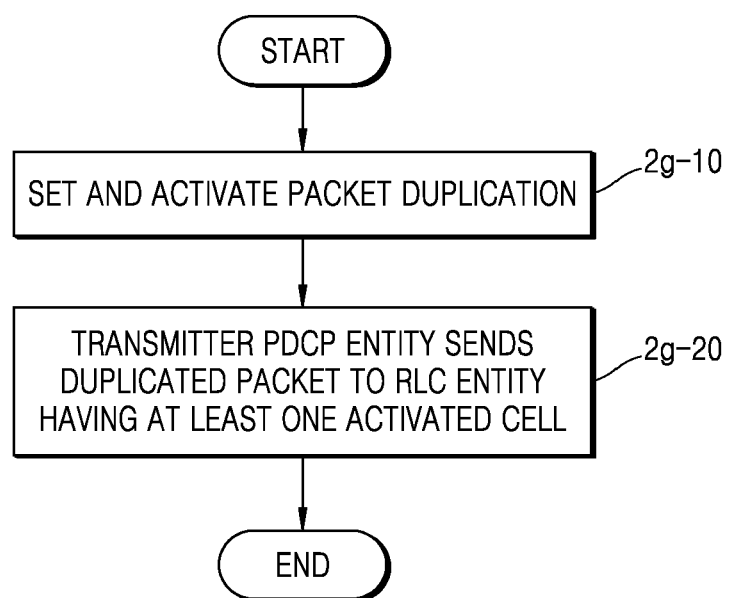
FIG. 21 is a diagram illustrating an operation of performing packet duplication in a transmitter packet data convergence protocol (PDCP) entity, according to an embodiment.

FIG. 21 is a diagram illustrating an operation of performing packet duplication in a transmitter PDCP entity according to an embodiment.

As described above with reference to FIG. 20, a cell that is usable by each RLC device, in other words, a logical channel may be deactivated to thus be unusable. In this case, a packet duplication operation of the transmitter PDCP entity may change.

In operation 2g-10, when packet duplication of a radio bearer is set and activated, the process may proceed to operation 2g-20, and the transmitter PDCP entity may check whether RLC entities to be used for packet duplication has at least one activated cell, and send a duplicated packet to a RLC entity having at least one activated cell. Through the operation, a RLC entity having no cell to be used may be prevented from unnecessarily performing a data processing operation.

Figure 22:
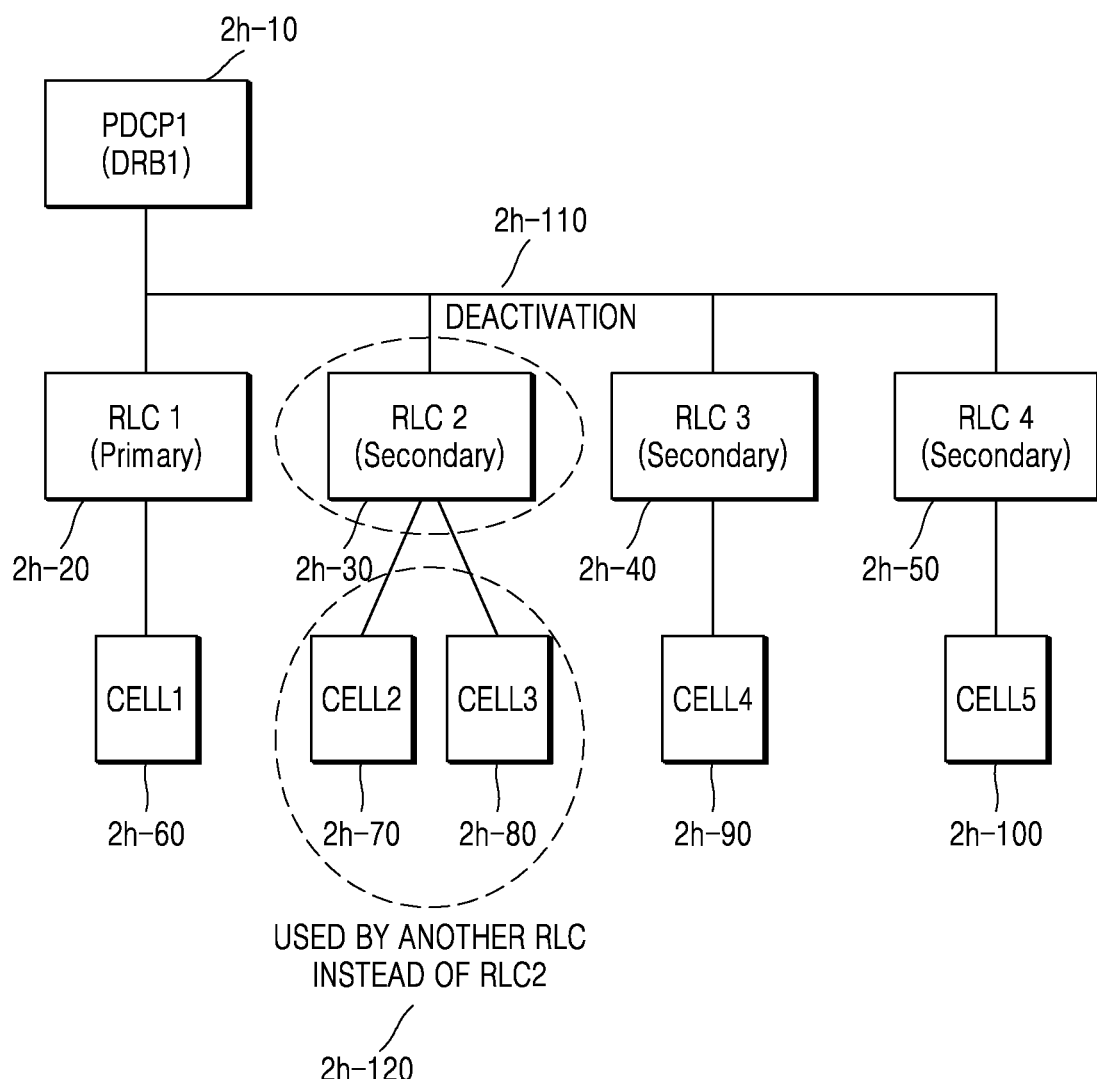
FIG. 22 is a diagram for describing an operation according to packet duplication transmission deactivation of a specific radio link control (RLC) entity in a bearer to which packet duplication is configured according to an embodiment.

FIG. 22 is a diagram for describing an operation according to packet duplication transmission deactivation of a specific RLC entity in a bearer for which packet duplication has been configured according to an embodiment.

Referring to FIG. 22, a cell restriction and a radio bearer for packet duplication as described above with reference to FIG. 15 are assumed. When a specific one of RLC entities set to enable a UE to participate in packet duplication is deactivated, a cell that is usable by the corresponding logical channel may no longer send data. As such, not using some cells being in an activated state may cause consumption of radio sources. Accordingly, it may be efficient to cause other cells of the same radio bearer to use the cells.

According to an embodiment, a case in which packet duplication of RLC2 2h-30 is deactivated is assumed (2h-110). In other words, the RLC2 2h-30 may not participate in packet duplication transmission, and a transmitter PDCP entity may not transmit any duplicated packet to the RLC2 2h-30. In this case, Cell2 2h-70 and Cell3 2h-80 set to be usable by the RLC2 2h-30 may be used by another RLC device. According to an embodiment, a RLC entity which will use a cell set to be usable by a deactivated RLC entity may change. For example, a primary RLC entity may use the cell set to be usable by the deactivated RLC device. Also, a RLC entity having a highest or lowest logical channel ID among different secondary RLC entities in the same cell group may use the cell set to be usable by the deactivated RLC device. Furthermore, after a RLC entity is deactivated by a RRC configuration by a base station, a RLC entity may be configured to use a cell of the deactivated RLC entity.

Figure 23:
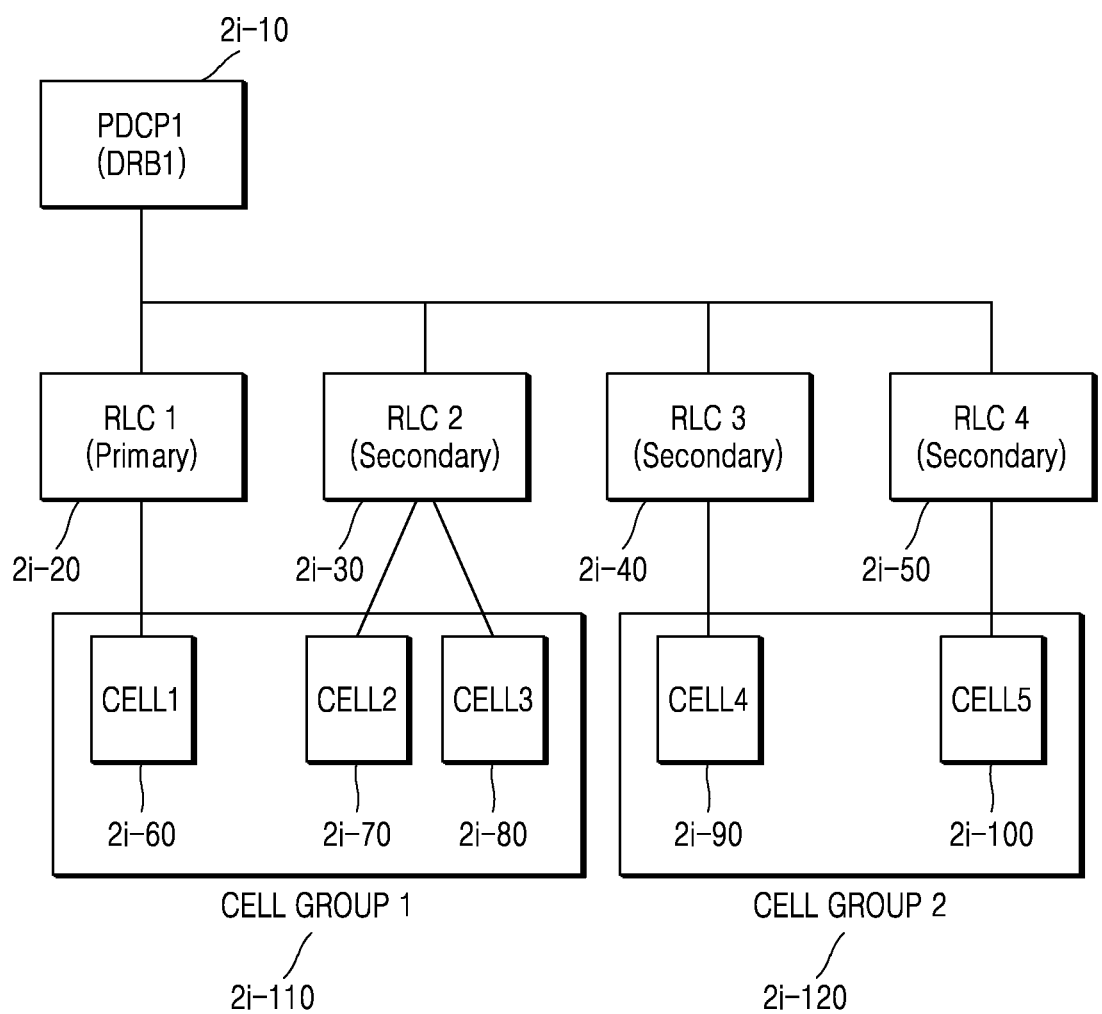
FIG. 23 is a diagram for describing an operation of applying a cell restriction when two or more cell groups are applied, according to an embodiment.

FIG. 23 is a diagram for describing an operation of applying a cell restriction when two or more cell groups are applied, according to an embodiment.

Referring to FIG. 23, a cell restriction and a radio bearer for packet duplication as described above with reference to FIG. 15 are assumed. In a dual connectivity structure, connections to a plurality of base stations may be performed in unit of a cell group. That is, a cell group may include at least one cell, and correspond to a MAC entity and a base station. In this case, logical channels belonging to different cell groups, that is, RLC entities belonging to different cell groups may not perform transmission together because the RLC entities use different MAC entities. When only one RLC entity performs packet duplication in a cell group, a cell restriction as shown in FIG. 23 may not need to be maintained for packet duplication. Accordingly, when, although packet duplication transmission of a radio bearer is activated, a RLC entity used for packet duplication in the same cell group is one or less, no cell restriction may be applied.

According to an embodiment, RLC1 2i-20 and RLC2 2i-30 may operate in Cell Group1 2i-110, wherein the RLC1 2i-20 may use Cell1 2i-60 and the RLC2 2i-30 may use Cell2 2i-70 and Cell3 2i-80. RLC3 2i-40 and RLC4 2i-50 may operate in Cell Group2 2i-120, wherein the RLC3 2i-40 may use Cell4 2i-90 and the RLC4 2i-50 may use Cell5 2i-100. For example, when the RLC3 2i-40 is not used for packet duplication transmission and the RLC4 2i-50 is used for packet duplication transmission by a RRC configuration or activation/deactivation setting, the RLC4 2i-50 may use, instead of using only the Cell5 2i-100 being usable by itself, both the Cell5 2i-100 and the Cell4 2i-90 set to the Cell Group2 2i-120.

Figure 24:
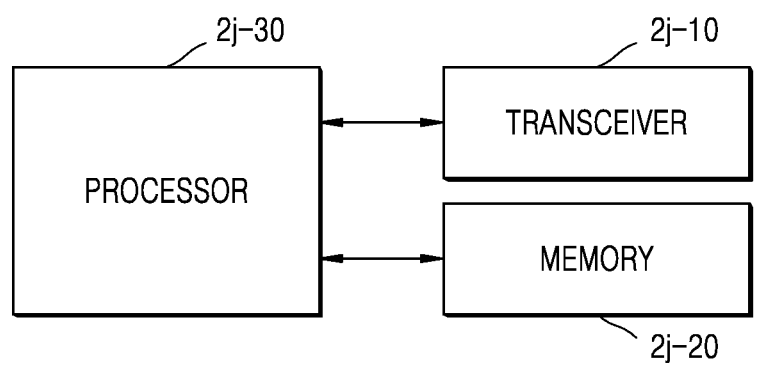
FIG. 24 is a block diagram illustrating an internal structure of a UE according to another embodiment.

FIG. 24 is a block diagram illustrating an internal structure of a UE according to another embodiment.

Referring to FIG. 24, the UE may include a transceiver 2j-10, a memory 2j-20, and a processor 2j-30. The transceiver 2j-10, the memory 2j-20, and the processor 2j-30 of the UE may operate according to a communication method of the UE as described above. However, components of the UE are not limited to the above-mentioned components. For example, the UE may include more or less components that those mentioned above. Also, the transceiver 2*j*-10, the memory 2*j*-20, and the processor 2*j*-30 may be implemented in a form of a single chip.

The transceiver 2*j*-10 may transmit and receive a signal to and from another network entity, for example, a base station. Herein, the signal may include control information and data. To transmit and receive signals, the transceiver 2*j*-10 may be configured with an RF transmitter for up-converting a frequency of a signal to be transmitted and amplifying the signal, and an RF receiver for low-noise amplifying a received signal and down-converting a frequency of the received signal. However, the RF transmitter and RF receiver are an embodiment of the transceiver 2*j*-10, and components of the transceiver 2*j*-10 are not limited to the RF transmitter and the RF receiver.

Also, the transceiver 2*j*-10 may receive a signal through a wireless channel, output the signal to the processor 2*j*-30, and transmit a signal output from the processor 1*m*-30 through the wireless channel. For example, the transceiver 2*j*-10 may receive system information from a base station, and receive a synchronization signal or a reference signal.

The memory 2*j*-20 may store programs and data required for operations of the UE. Also, the memory 2*j*-20 may store control information or data included in signals obtained by the UE. For example, the memory 2*j*-20 may store information transmitted/received through the transceiver 2*j*-10, and information generated by the processor 2*j*-30. The memory 2*j*-20 may be configured with storage media, such as ROM, RAM, a hard disc, CD-ROM, and a DVD, or a combination of the storage media.

The processor 2*j*-30 may control a series of processes such that the UE operates according to the above-described embodiments of the disclosure. For example, the processor 2*j*-30 may control signal flows between blocks to perform operations according to the above-described flowchart. Also, the processor 2*j*-30 may include a circuit or an application-specific integrated circuit.

Figure 25:
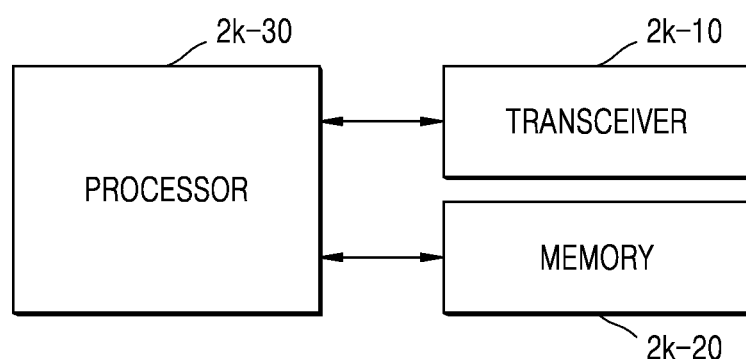
FIG. 25 is a block diagram illustrating a configuration of a base station according to another embodiment.

FIG. 25 is a block diagram illustrating a configuration of a base station according to another embodiment.

Referring to FIG. 25, the base station may include a transceiver 2*k*-10, a memory 2*k*-20, and a processor 2*k*-30. The transceiver 2*k*-10, the memory 2*k*-20, and the processor 2*k*-30 of the base station may operate according to a communication method of the base station as described above. However, components of the base station are not limited to the above-mentioned components. For example, the base station may include more or less components that those mentioned above. The transceiver 2*k*-10, the memory 2*k*-20, and the processor 2*k*-30 may be implemented in a form of a single chip.

The transceiver 2*k*-10 may transmit and receive a signal to and from another network entity, for example, a UE. The signal may include control information and data. To transmit and receive signals, the transceiver 2*k*-10 may be configured with an RF transmitter for up-converting a frequency of a signal to be transmitted and amplifying the signal, and an RF receiver for low-noise amplifying a received signal and down-converting a frequency of the received signal. However, the RF transmitter and the RF receiver are an embodiment of the transceiver 2*k*-10, and components of the transceiver 2*k*-10 are not limited to the RF transmitter and the RF receiver.

Also, the transceiver 2*k*-10 may receive a signal through a wireless channel, output the signal to the processor 2*k*-30, and transmit a signal output from the processor 2*k*-30 through the wireless channel. For example, the transceiver 2*k*-10 may transmit system information to the UE, and transmit a synchronization signal or a reference signal to the UE.

The memory 2*k*-20 may store programs and data required for operations of the base station. Also, the memory 2*k*-20 may store control information or data included in a signal acquired by the base station. For example, the memory 2*k*-20 may store information transmitted/received through the transceiver 2*k*-10, and information generated by the processor 2*k*-30. The memory 2*k*-20 may be configured with storage media, such as ROM, RAM, a hard disc, CD-ROM, and a DVD, or a combination of the storage media.

The processor 2*k*-30 may control a series of processes such that the base station operates according to the above-described embodiments of the disclosure. Also, the processor 2*k*-30 may include a circuit or an application-specific integrated circuit.

Figure 26:
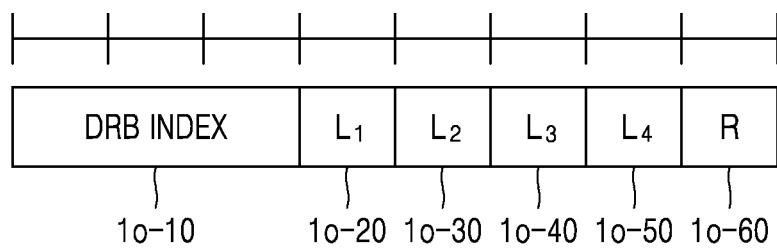
FIG. 26 illustrates a format of a packet duplication activation/deactivation message, according to another embodiment.

FIG. 26 illustrates a format of a packet duplication activation/deactivation message according to another embodiment.

Referring to FIG. 26, the packet duplication activation/deactivation message may have a MAC CE format. According to an embodiment, the packet duplication activation/deactivation message may include a DRB index 1*o*-10 and Li (i=1, 2, 3, 4, 5) fields 1*o*-20, 1*o*-30, 1*o*-40, and 1*o*-50 corresponding to RLC entities. The DRB index 1*o*-10 may be a preset value which may be applied as one of the following values.

specified in a DRM configuration upon a setting by a base station applied in an ascending order of DRB IDs of radio bearers for which packet duplication has been set applied in an ascending order of DRB IDs of radio bearers for which RLC entities exist and packet duplication has been set, by a MAC entity that has transmitted the MAC ME DRB ID values The Li fields 1*o*-20,1*o*-30,1*o*-40, and 1*o*-50 may represent the respective RLC entities, and each of the Li fields 1*o*-20,1*o*-30,1*o*-40 and 1*o*-50 may set whether or not to use the corresponding RLC entity for packet duplication transmission according to its bit value. For example, a value 1 of a Li field may represent that the corresponding RLC entity is used for packet duplication transmission, and a value 0 of a Li field may represent that the corresponding RLC entity is not used for packet duplication transmission. A Li field may indicate a RLC entity by using a preset value which may be applied as one of the following values.

applied in an ascending (descending) order of LCIDs of a master cell group and then in an ascending (descending) order of LCIDs of a secondary cell group in an ascending order of preset indices corresponding to RLC entities applied in an ascending order of priorities of the corresponding logical channels, and arranged in an ascending order of LCIDs of a master cell group in the case of the same priority As a result of reception of a packet duplication activation/deactivation message, a UE may determine a RLC device(s) of a DRB, which will be used for packet duplication transmission, and perform packet duplication transmission.

All RLC entities set in the DRB may have Li fields. In this case, in the radio bearer of FIG. 3, all of four RLC entities may have Li fields, and each of the four RLC entities may be set about whether to be used for packet duplication transmission. According to another embodiment, only a RLC device(s) of which an ul_duplication field as described above with reference to FIG. 3 has been set to true may have the corresponding Li field. In this case, in the radio bearer of FIG. 3, three RLC entities of which up_duplication fields have been set to true may have Li fields, and may be set about whether to be used for packet duplication transmission.

According to another embodiment, the number of RLC entities set in a DRB for which packet duplication transmission has been set may be identical to the number of Li fields. In the embodiment of FIG. 26, four Li fields 1o-20, 1o-30, 1o-40, and 1o-50 have been set. Setting four Li fields may represent a state in which the number of RLC entities set in the corresponding DRB is 4. For example, when the number of RLC entities set in the corresponding DRB is 3, Li fields $L_1$, $L_2$, and $L_3$ may be provided. Then, a reserved (R) field 1o-60 may be included to fill a byte length. This means filling an R bit such that a length of the packet duplication activation/deactivation message shown in FIG. 26 is a byte length, that is, a multiple of 8 bits. A value of the R bit may be set to a predefined value, or the UE may ignore the predefined value.

In a dual connectivity structure, whether to use all RLC entities for packet duplication transmission may be not indicated in a packet duplication activation/deactivation message transmitted to a specific cell group. For example, a MAC CE transmitted to a master cell group (MCG) may indicate whether to use only RLC entities set in the MCG for packet duplication transmission. In this case, the number of Li fields may be identical to the number of RLC entities which are indicated whether to be used for packet duplication transmission in the corresponding MAC CE. For example, in a certain radio bearer for which packet duplication transmission has been set, when the number of RLC entities set in a MCG is 2, the number of Li fields may be 2, and the remaining fields may be R fields.

According to another embodiment, Li fields may be set to a maximum number of RLC entities that are settable for each radio bearer, and whether to use actually set RLC entities for packet duplication may be determined by actual Li fields. For example, when four RLC entities are actually settable, four Li fields $L_1$, $L_2$, $L_3$, and $L_4$ 1o-10, 1o-20, 1o-30, and 1o-40 may be provided. When the number of actually set RLC entities is 3, the Li fields $L_1$, $L_2$, and $L_3$ 1o-10, 1o-20, and 1o-30 may be used to indicate whether to use the corresponding RLC entities for packet duplication transmission. Because the Li field $L_4$ has no corresponding RLC device, the Li field $L_4$ may be set to a predefined value of 0 or 1, and the UE may ignore the predefined value.

Because the packet duplication activation/deactivation message of FIG. 26 has a fixed-size of 1 byte, the packet duplication activation/deactivation message may be a fixed-size MAC CE. In this case, the fixed-size MAC CE may have a MAC subheader for a fixed-size MAC CE which will be described later with reference to FIG. 30.

Figure 27:
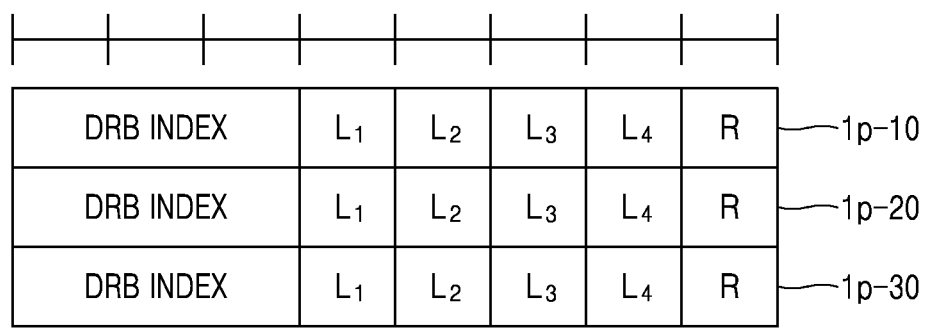
FIG. 27 illustrates a format of a packet duplication activation/deactivation message, according to another embodiment.

FIG. 27 illustrates a format of a packet duplication activation/deactivation message according to another embodiment.

Referring to FIG. 27, the packet duplication activation/deactivation message may have a MAC CE format. In FIG. 27, three messages 1p-10, 1p-20, and 1p-30 each having a DRB index, Li fields corresponding to RLC entities, and a R field being a reserved field for filling a byte length, as described above with reference to FIG. 26, may overlap to construct a MAC CE. However, this is only an example, and the number of overlapping MAC CEs is not limited. The number of MAC CEs to overlap may be determined variably by a base station with respect to a radio bearer for which the base station intends to set packet duplication. When the number of radio bearers which are included in the packet duplication activation/deactivation message of FIG. 27 and which will control packet duplication transmission is variable, a variable-size MAC CE may be used. In this case, the variable-size MAC CE may have a MAC subheader for a variable-size MAC CE which will be described with reference to FIG. 29. However, an embodiment of an application method for Li fields and R fields may be the same as the example described above with reference to FIG. 26.

In this case, packet duplication for a RLC entity of a radio bearer indicated by a DRB index may be allowed. The DRB index may be a preset value which may be applied as one of the following values.

specified in a DRM configuration upon a setting by a base station applied in an ascending order of DRB IDs of radio bearers for which packet duplication has been set applied in an ascending order of DRB IDs of radio bearers for which RLC entities exist and packet duplication has been set, by a MAC entity that has transmitted the MAC ME DRB ID values The Li fields may represent the respective RLC entities, and each of the Li fields may set whether or not to use the corresponding RLC entity for packet duplication transmission according to its bit value. For example, a value 1 of a Li field may represent that the corresponding RLC entity is used for packet duplication transmission, and a value 0 of a Li field may represent that the corresponding RLC entity is not used for packet duplication transmission. A Li field may indicate a RLC entity by using a preset value which may be applied as one of the following values.

applied in an ascending (descending) order of LCIDs of a master cell group and then in an ascending (descending) order of LCIDs of a secondary cell group in an ascending order of preset indices corresponding to RLC entities applied in an ascending order of priorities of the corresponding logical channels, and arranged in an ascending order of LCIDs of a master cell group in the case of the same priority As a result of reception of a packet duplication activation/deactivation message, a UE may determine a RLC device(s) of a DRB, which will be used for packet duplication transmission, and perform packet duplication transmission.

All RLC entities set in the DRB may have Li fields. In this case, in the radio bearer of FIG. 3, all of four RLC entities may have Li fields, and each of the four RLC entities may be set about whether to be used for packet duplication transmission. According to another embodiment, only a RLC device(s) of which an ul_duplication field as described above with reference to FIG. 3 has been set to true may have the corresponding Li field. In this case, in the radio bearer of FIG. 3, three RLC entities of which up_duplication fields have been set to true may have Li fields, and may be set about whether to be used for packet duplication transmission.

According to another embodiment, the number of RLC entities set in a DRB for which packet duplication transmission has been set may be identical to the number of Li fields. In the embodiment of FIG. 27, four Li fields have been set for each of all radio bearers. This may represent that the number of RLC entities set in the corresponding DRB is 4. For example, when the number of RLC entities set in the corresponding DRB is 3, Li fields $L_1$, $L_2$, and $L_3$ may be provided. Then, a reserved (R) field may be included to fill a byte length. This means filling an R bit such that a length of the packet duplication activation/deactivation message shown in FIG. 27 is a byte length, that is, a multiple of 8 bits. A value of the R bit may be set to a predefined value, or the UE may ignore the predefined value.

In a dual connectivity structure, whether to use all RLC entities for packet duplication transmission may be not indicated in a packet duplication activation/deactivation message transmitted to a specific cell group. For example, a MAC CE transmitted to a MCG may indicate whether to use only RLC entities set in the MCG for packet duplication transmission. In this case, the number of Li fields may be identical to the number of RLC entities which are indicated whether to be used for packet duplication transmission in the corresponding MAC CE. For example, in a certain radio bearer for which packet duplication transmission has been set, when the number of RLC entities set in a MCG is 2, the number of Li fields may be 2, and the remaining fields may be R fields.

According to another embodiment, Li fields may be set to a maximum number of RLC entities that are settable for each radio bearer, and whether to use actually set RLC entities for packet duplication may be determined by actual Li fields. For example, when four RLC entities are actually settable, four Li fields $L_1$, $L_2$, $L_3$, and $L_4$ may be provided. When the number of actually set RLC entities is 3, the Li fields $L_1$, $L_2$, and $L_3$ may be used to indicate whether to use the corresponding RLC entities for packet duplication transmission. However, because the Li field $L_4$ has no corresponding RLC device, the Li field $L_4$ may be set to a predefined value of 0 or 1, and the UE may ignore the predefined value.

Figure 28:
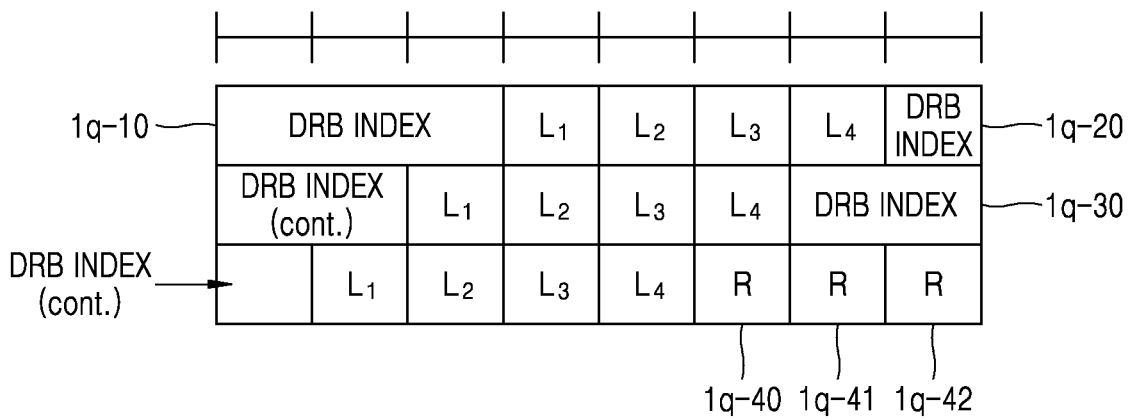
FIG. 28 illustrates a format of a packet duplication activation/deactivation message, according to another embodiment.

FIG. 28 illustrates a format of a packet duplication activation/deactivation message according to another embodiment.

Referring to FIG. 28, the packet duplication activation/deactivation message may have a MAC CE format. In FIG. 28, three messages 1*q*-10, 1*q*-20, and 1*q*-30 each having a DRB index and Li fields corresponding to RLC entities, as described above with reference to FIG. 26, may overlap to construct a MAC CE. However, this is only an example, and the number of overlapping MAC CEs is not limited. The number of MAC CEs to overlap may be determined variably by a base station with respect to a radio bearer for which the base station intends to set packet duplication. When the number of radio bearers which are included in the packet duplication activation/deactivation message of FIG. 28 and which will control packet duplication transmission is variable, a variable-size MAC CE may be used. In this case, the variable-size MAC CE may have a MAC subheader for a variable-size MAC CE which will be described in FIG. 29. However, an embodiment of an application method for Li fields and R fields may be the same as the example described above with reference to FIG. 26.

In the embodiment of FIG. 28, reserved (R) fields 1*q*-40, 1*q*-41 and 1*q*-42 have been used in a final bit of the MAC CE to fill a byte length of the entire message. That is, the DRB indices and Li fields may list values for all radio bearers indicated in the corresponding packet duplication activation/deactivation message. An application method of the DRB indices and Li fields shown in the embodiment of FIG. 28 is the same as that described above with reference to FIG. 27.

Figure 29:
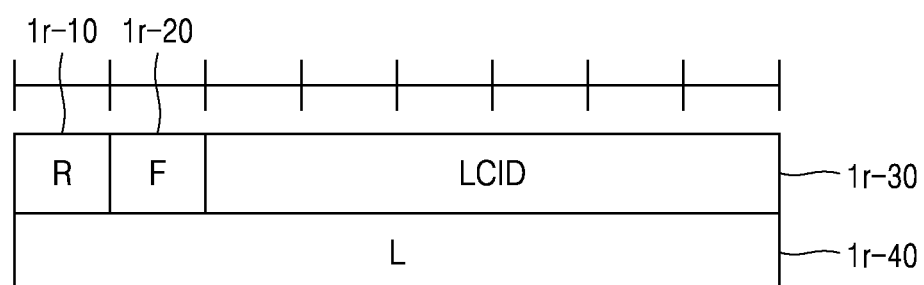
FIG. 29 illustrates a medium access control (MAC) subheader format of a variable-size MAC control element (CE), according to an embodiment.

FIG. 29 illustrates a MAC subheader format of a variable-size MAC CE according to an embodiment. A MAC subheader may be positioned in front of a MAC CEL to inform information included in the following MAC CE. A variable-size MAC CE may mean a MAC CE of which a length is not fixed. The MAC subheader may include a length (L) field 1*r*-40 to inform a length of the following MAC CE. Also, the MAC subheader may have a reserved (R) field 1*r*-10, an F field 1*r*-20, and a LCID field 1*r*-30. The F field 1*r*-20 may be a field for informing a length of the L field 1*r*-40. When the F field 1*r*-20 is 0, this may represents that the L field 1*r*-40 is 1 byte, and, when the F field 1*r*-20 is 1, this may represent that the L field 1*r*-40 is 2 bytes. In the embodiment of FIG. 29, the F field 1*r*-20 has a value of 0, and the L field 1*r*-40 has a length of 1 byte. The LCID field 1*r*-30 may include a value representing a kind of the following MAC CE. When a packet duplication activation/deactivation message follows the LCID field 1*r*-30, the LCID field 1*r*-30 may have a LCID value representing a packet duplication activation/deactivation message.

Figure 30:
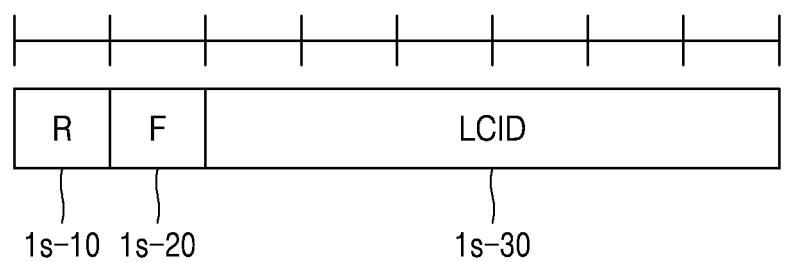
FIG. 30 illustrates a MAC subheader format of a fixed-size MAC CE, according to an embodiment.

FIG. 30 illustrates a MAC subheader format of a fixed-size MAC CE according to an embodiment. A MAC subheader may be positioned in front of a MAC CE to inform information included in the following MAC CE. A fixed-size MAC CE may mean a MAC CE of which a length is fixed. Accordingly, a MAC subheader of a fixed-size MAC CE may not need the L field 1*r*-40 shown in FIG. 29. Accordingly, the MAC subheader of the fixed-size MAC CE may include a reserved (R) field 1*s*-10, an F field 1*s*-20, and a LCID field 1*s*-30. The F field 1*s*-20 may be a field informing a length of an L field. In the embodiment of FIG. 30, no L field may be required. Therefore, the F field 1*s*-20 may be set to a value of 0, and a UE may ignore the F field 1*s*-20. The LCID field 1*s*-30 may be a value representing a kind of the following MAC CE. When a packet duplication activation/deactivation message follows the LCID field 1*s*-30, the LCID field 1*s*-30 may have a LCID value representing a packet duplication activation/deactivation message.

The methods according to the embodiments of the disclosure described in claims or specification thereof may be implemented in hardware, software, or a combination of hardware and software.

When the methods are implemented in software, a computer-readable storage medium storing at least one program (software module) may be provided. The at least one program stored in the computer-readable storage medium may be configured for execution by at least one processor within an electronic device. The at least one program may include instructions that cause the electronic device to execute the methods according to the embodiments of the disclosure described in the claims or specification thereof.

The program (software module or software) may be stored in RAM, a non-volatile memory including a flash memory, ROM, an electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wireless LAN (WLAN), and a storage area network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience, and the disclosure is not limited to the singular or plural form. A component expressed in a plural form may be configured as a single component, or a component expressed in a singular form may be configured as a plurality of components.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed. For example, some parts of the embodiments of the disclosure may be combined to operate a base station and UE. Also, the embodiments may operate in various communication systems, such as frequency division duplex-long term evolution (FDD LTE) system, time division duplex-long term evolution (TDD LTE) system, and 5G or NR system, and other modified examples based on the technical concept of the embodiments may be executable.

The invention claimed is:

1. A terminal for controlling packet duplication in a wireless communication system, the terminal comprising:
   a transceiver; and
   at least one processor coupled to the transceiver and configured to
   receive, from a base station, Packet Data Convergence Protocol (PDCP) configuration information including a duplication field for a plurality of Radio Link Control (RLC) entities via a Radio resource control (RRC) message,
   identify at least one activated RLC entity from among the plurality of RLC entities, based on the duplication field for the plurality of RLC entities, and
   duplicate a PDCP packet and deliver the duplicated PDCP packet to the at least one activated RLC entity.

2. The terminal of claim 1, wherein the at least one processor is further configured to:
   transmit, to the base station, capability information indicating whether to support duplication transmission by using more than two RLC entities.

3. The terminal of claim 1, wherein the duplication field for the plurality of RLC entities indicates 'true' for a first RLC entity and 'false' for a second RLC entity, and
   wherein the at least one processor is further configured to:
   activate the first RLC entity based on the duplication field for the plurality of RLC entities, and
   deactivate the second RLC entity based on the duplication field for the plurality of RLC entities.

4. The terminal of claim 1, wherein the duplication field for the plurality of RLC entities includes an index determined based on a logical channel identifier (ID) of the plurality of RLC entities.

5. The terminal of claim 1, wherein the at least one processor is further configured to:
   receive a duplication RLC activation or deactivation Medium Access Control (MAC) Control Element (CE), and
   determine whether each of a plurality of secondary RLC entities is activated or deactivated based on the duplication RLC activation or deactivation MAC CE.

6. The terminal of claim 5, wherein the duplication RLC activation or deactivation MAC CE comprises a Data Radio Bearer (DRB) index indicating an identity of a DRB and at least one RLC field that corresponds to each of the plurality of secondary RLC entities and indicates activation or deactivation status of duplication for a corresponding secondary RLC entity from among the plurality of secondary RLC entities.

7. The terminal of claim 6, wherein the at least one RLC field indicating activation or deactivation of duplication for the corresponding RLC entity is identified by ascending order of logical channel IDs in an order of master cell group (MCG) and secondary cell group (SCG).

8. The terminal of claim 6, wherein the at least one RLC field indicating activation or deactivation of duplication for the corresponding RLC entity comprises a first RLC field for a first RLC entity, and
   wherein the at least one processor is further configured to:
   when the first RLC field is set to 1, activate the first RLC entity for PDCP duplication, and
   when the first RLC field is set to 0, deactivate the first RLC entity for PDCP duplication.

9. The terminal of claim 1, wherein a primary RLC entity cannot be deactivated, and
   wherein a plurality of secondary RLC entities transmit data when the plurality of secondary RLC entities are activated.

10. The terminal of claim 1, wherein the at least one processor is further configured to:
    indicate, by a PDCP entity, a deactivated RLC entity to discard all duplicated PDCP packets.

11. The terminal of claim 1, wherein the at least one processor is further configured to:
    receive, from the base station, logical channel configuration information including information associated with at least one cell used by a logical channel, and
    determine not to apply the information associated with the at least one cell used by the logical channel when none or only one of the plurality of RLC entities remains activated.

12. The terminal of claim 1, wherein the at least one processor is further configured to:
    receive, from the base station, logical channel configuration information including information associated with cell restriction mapped with a logical channel;
    wherein the cell restriction is not applied when none or only one of the plurality of RLC entities remains activated in a cell group regardless of the information associated with cell restriction mapped with the logical channel.

13. A method, performed by a terminal, for controlling packet duplication in a wireless communication system, the method comprising:
    receiving, from a base station, Packet Data Convergence Protocol (PDCP) configuration information including a duplication field for a plurality of Radio Link Control (RLC) entities via a Radio resource control (RRC) message;
    identifying at least one activated RLC entity from among the plurality of RLC entities based on the duplication field for the plurality of RLC entities; and
    duplicating a PDCP packet and delivering the duplicated PDCP packet to the at least one activated RLC entity.

14. The method of claim 13, wherein the duplication field for the plurality of RLC entities indicates 'true' for a first RLC entity and 'false' for a second RLC entity, and
    wherein the method further comprises:
    activating the first RLC entity based on the duplication field for the plurality of RLC entities; and
    deactivating the second RLC entity based on the duplication field for the plurality of RLC entities.

15. The method of claim 13, further comprising:
receiving, from the base station, a duplication RLC activation or deactivation Medium Access Control (MAC) Control Element (CE); and
determining whether each of a plurality of secondary RLC entities is activated or deactivated based on the duplication RLC activation or deactivation MAC CE.

16. The method of claim 15, wherein the duplication RLC activation or deactivation MAC CE comprises a Data Radio Bearer (DRB) index indicating an identity of a DRB and at least one RLC field that corresponds to each of the plurality of secondary RLC entities and indicates activation or deactivation status of duplication for a corresponding secondary RLC entity from among the plurality of secondary RLC entities,
wherein a first RLC entity is activated for PDCP duplication when a first RLC field corresponding to the first RLC entity is set to 1, and
wherein a second RLC entity is deactivated for PDCP duplication when a second RLC field corresponding to the second RLC entity is set to 0.

17. The method of claim 16, wherein the at least one RLC field indicating activation or deactivation of duplication for the corresponding RLC entity is identified by ascending order of logical channel IDs in an order of master cell group (MCG) and secondary cell group (SCG).

18. The method of claim 13, wherein a primary RLC entity cannot be deactivated, and
wherein a plurality of secondary RLC entities transmit data when the plurality of secondary RLC entities are activated.

19. The method of claim 14, further comprising:
receiving, from the base station, logical channel configuration information including information associated with at least one cell used by a logical channel; and
determining not to apply the information associated with the at least one cell used by the logical channel when none or only one of the plurality of RLC entities remains activated.

20. The method of claim 13, further comprising receiving, from the base station, logical channel configuration information including information associated with cell restriction mapped with a logical channel;
wherein the cell restriction is not applied when none or only one of the plurality of RLC entities remains activated in a cell group regardless of the information associated with cell restriction mapped with the logical channel.

* * * * *